United States Patent
Obkircher et al.

(10) Patent No.: US 11,314,685 B2
(45) Date of Patent: *Apr. 26, 2022

(54) LOW NOISE SERIAL INTERFACES WITH GATED CLOCK

(71) Applicant: Skyworks Solutions, Inc., Irvine, CA (US)

(72) Inventors: Thomas Obkircher, Santa Ana, CA (US); Guillaume Alexandre Blin, Carlisle, MA (US); James Henry Ross, Cedar Rapids, IA (US); Bryan J. Roll, Cedar Rapids, IA (US)

(73) Assignee: Skyworks Solutions, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/249,108

(22) Filed: Feb. 19, 2021

(65) Prior Publication Data

US 2021/0173807 A1    Jun. 10, 2021

Related U.S. Application Data

(63) Continuation of application No. 16/553,578, filed on Aug. 28, 2019, now Pat. No. 10,963,418, which is a continuation of application No. 15/876,441, filed on Jan. 22, 2018, now Pat. No. 10,437,774.

(60) Provisional application No. 62/450,851, filed on Jan. 26, 2017, provisional application No. 62/477,001, filed on Mar. 27, 2017.

(51) Int. Cl.
*G06F 13/42* (2006.01)
*H04B 1/40* (2015.01)

(52) U.S. Cl.
CPC ............ *G06F 13/4291* (2013.01); *H04B 1/40* (2013.01)

(58) Field of Classification Search
CPC .... G06F 13/4291; G06F 13/362; G06F 13/42; G06F 13/3625
See application file for complete search history.

(56) References Cited

U.S. PATENT DOCUMENTS

| | | |
|---|---|---|
| 4,371,928 A | 2/1983 | Barlow et al. |
| 4,853,847 A | 8/1989 | Mitsurou |
| 5,875,353 A | 2/1999 | Whetsel |
| 6,407,960 B1 | 6/2002 | Egbert et al. |
| 7,827,330 B2 | 11/2010 | Richards et al. |
| 7,962,662 B2 | 6/2011 | Richards et al. |
| 8,423,823 B2 | 4/2013 | Venus et al. |

(Continued)

FOREIGN PATENT DOCUMENTS

| | | |
|---|---|---|
| EP | 0613147 B1 | 8/1999 |
| EP | 2003548 B1 | 3/2011 |

*Primary Examiner* — Phong H Dang
(74) *Attorney, Agent, or Firm* — Knobbe, Martens, Olson & Bear, LLP

(57) ABSTRACT

Low noise serial interfaces with gated clock are provided herein. In certain configurations herein, a slave device of a serial interface includes a shift register for serially shifting in an interface data signal based on timing of an interface clock signal, a control circuit (for instance, a finite-state machine) for controlling the slave device, and a register bank for storing data programmed to the slave device via the serial interface. The control circuit cuts off or gates the interface clock signal in response to determining that an interface command received over the serial interface is not intended for the slave device.

20 Claims, 17 Drawing Sheets

(56) References Cited

U.S. PATENT DOCUMENTS

| | | | |
|---|---|---|---|
| 9,189,430 B2 | 11/2015 | Ross et al. | |
| 10,437,774 B2 * | 10/2019 | Obkircher | G06F 13/4291 |
| 10,963,418 B2 * | 3/2021 | Obkircher | G06F 13/4291 |
| 2003/0070025 A1 | 4/2003 | Watts et al. | |
| 2005/0108454 A1 | 5/2005 | Baker et al. | |
| 2005/0289379 A1 | 12/2005 | Teutsch et al. | |
| 2008/0201588 A1 | 8/2008 | Pyeon et al. | |
| 2008/0215906 A1 | 9/2008 | Swaney et al. | |
| 2009/0031048 A1 | 1/2009 | Richards et al. | |
| 2009/0077295 A1 | 3/2009 | Konno et al. | |
| 2009/0292843 A1 | 11/2009 | Haban et al. | |
| 2009/0307511 A1 | 12/2009 | Fiennes et al. | |
| 2011/0235459 A1 | 9/2011 | Ware et al. | |
| 2012/0117284 A1 | 5/2012 | Southcombe et al. | |
| 2012/0246367 A1 | 9/2012 | Sakimoto et al. | |
| 2016/0077990 A1 | 3/2016 | Tsujita | |
| 2016/0179746 A1 | 6/2016 | Hein et al. | |
| 2017/0192918 A1 | 7/2017 | Tenbroek et al. | |
| 2018/0089121 A1 | 3/2018 | Nakamuta et al. | |

\* cited by examiner

US 11,314,685 B2

LOW NOISE SERIAL INTERFACES WITH GATED CLOCK

CROSS-REFERENCE TO RELATED APPLICATIONS

This application is a continuation of U.S. application Ser. No. 16/553,578, filed Aug. 28, 2019 and titled "LOW NOISE SERIAL INTERFACES WITH GATED CLOCK," which is a continuation of U.S. application Ser. No. 15/876, 441, filed Jan. 22, 2018 and titled "LOW NOISE SERIAL INTERFACES WITH GATED CLOCK," which claims the benefit of priority under 35 U.S.C. § 119 of U.S. Provisional Patent Application No. 62/477,001, filed Mar. 27, 2017 and titled "LOW NOISE SERIAL INTERFACES WITH GATED CLOCK," and U.S. Provisional Patent Application No. 62/450,851, filed Jan. 26, 2017 and titled "LOW NOISE SERIAL INTERFACES WITH GATED CLOCK," each of which is herein incorporated by reference in its entirety.

BACKGROUND

Field

Embodiments of the invention relate to electronic systems, and in particular, to serial interfaces for electronic systems.

Description of the Related Technology

Certain electronic systems can include a serial interface for writing data to and/or reading data to various blocks of the system. For example, a radio frequency (RF) system can include a mobile industry processor interface radio frequency front-end (MIPI RFFE) bus for writing and reading registers of various RF components.

SUMMARY

In certain embodiments, the present disclosure relates to a radio frequency system. The radio frequency system includes a serial interface, a radio frequency integrated circuit including a master device of the serial interface, the master device operable to send an interface command identifying a slave address, and a first radio frequency component including a first slave device of the serial interface. The first slave device is configured to receive an interface clock signal and an interface data signal from the serial interface. The first slave device includes a register bank configured to store configuration data received from the interface data signal, a shift register configured to shift in the interface data signal, and a control circuit configured to control operation of the register bank. The control circuit is operable to gate the interface clock signal in response to determining that the slave address does not identify the first slave device.

In some embodiments, the first radio frequency component further includes a radio frequency core circuit and an energy management core circuit configured to control the radio frequency core circuit based on the configuration data.

In various embodiments, the serial interface provides a supply voltage and a ground voltage to the first radio frequency component, and the control circuit operable to gate the interface clock signal to thereby prevent a harmonic of the interface clock signal from coupling to the radio frequency core circuit via the supply voltage and the ground voltage.

In a number of embodiments, the first slave device further includes a clock distribution circuit controlled by the control circuit, the clock distribution circuit configured to generate a gated clock signal based on the interface clock signal and on a clock gating control signal from the control circuit. In accordance with several embodiments, the gated clock signal is operable to control timing of at least one of the shift register, the control circuit, or the register bank. According to various embodiments, the control circuit is configured to prevent the gated clock signal from toggling in response to determining that the slave address does not identify the first slave device. In according with some embodiments, the control circuit includes a slave address detector configured to control gating of the interface clock signal based on comparing the slave address to a device user identification of the first slave device. According to several embodiments, the control circuit further includes a start-up sequence detector configured to prevent the slave address detector from gating the interface clock signal in response to detecting a start-up sequence of the serial interface. In accordance with various embodiments, the clock distribution circuit is further configured to generate a gated register clock signal configured to control timing of the register bank, and the control circuit is configured to prevent the gated register clock signal from toggling until after the control circuit determines that the slave address identifies the first slave device.

In some embodiments, the radio frequency system further includes a second radio frequency component including a second slave device of the serial interface.

In several embodiments, the control circuit is configured to cut off the interface clock signal from reaching at least one of the register bank, the control circuit, or the register bank in response to determining that the slave address does not identify the first slave device.

In various embodiments, the serial interface is a mobile industry processor interface radio frequency front-end bus.

In certain embodiments, the present disclosure relates to an integrated circuit for a radio frequency system. The integrated circuit includes a radio frequency core circuit, and an energy management core circuit configured to control the radio frequency core circuit based on configuration data received over a serial interface. The energy management core circuit includes a slave device configured to receive an interface clock signal and an interface data signal from the serial interface. The slave device includes a register bank configured to store the configuration data, a shift register configured to shift in the interface data signal, and a control circuit configured to control operation of the register bank, the control circuit operable to gate the interface clock signal in response to determining that a slave address of an interface command received over the serial interface does not identify the slave device.

In various embodiments, the slave device further includes a clock distribution circuit controlled by the control circuit, and the clock distribution circuit is configured to generate a gated clock signal based on the interface clock signal and a clock gating control signal.

In a number of embodiments, the gated clock signal is operable to control timing of at least one of the shift register, the control circuit, or the register bank.

In several embodiments, the control circuit is further configured to prevent the gated clock signal from toggling in response to determining that the slave address does not identify the slave device.

In a number of embodiments, the control circuit includes a slave address detector configured to control gating of the interface clock signal based on comparing the slave address to a device user identification of the slave device. In accordance with various embodiments, the control circuit further includes a start-up sequence detector configured to prevent the slave address detector from gating the interface clock signal in response to detecting a start-up sequence of the serial interface.

In several embodiments, the clock distribution circuit is further configured to generate a gated register clock signal configured to control timing of the register bank, and the control circuit is configured to prevent the gated register clock signal from toggling until after the control circuit determines that the slave address identifies the slave device.

In certain embodiments, the present disclosure relates to a slave device of a serial interface. The slave device includes a register bank configured to store configuration data received from an interface data signal of the serial interface, a shift register configured to shift in the interface data signal, and a control circuit configured to control operation of the register bank based on the interface data signal and an interface clock signal of the serial interface. The control circuit is operable to gate the interface clock signal in response to determining that a slave address of an interface command received over the serial interface does not identify the slave device.

In various embodiments, the control circuit is configured to cut off the interface clock signal from reaching at least one of the register bank, the control circuit, or the shift register in response to determining that the slave address does not identify the slave device.

In certain embodiments, the present disclosure relates to an integrated circuit for a radio frequency system. The integrated circuit includes a radio frequency core circuit and an energy management core circuit configured to provide the radio frequency core circuit with one or more analog control signals that are controllable by configuration data received over a serial interface. The energy management core circuit includes a slave device configured to receive an interface clock signal and an interface data signal of the serial interface. The slave device includes a register bank configured to store the configuration data, shift register circuitry configured to shift in the interface data signal, and a control circuit configured to control operation of the shift register circuitry and the register bank. The control circuit is configured to gate the interface clock signal in response to determining that a slave address of a first interface command received over the serial interface does not identify the slave device.

In a number of embodiments, the control circuit is further configured to generate a gated clock signal from the interface clock signal, and the gated clock signal is operable to control the shift register circuitry, the control circuit, and the register bank.

In several embodiments, the control circuit is further configured to prevent the gated clock signal from toggling to inhibit noise from reaching the radio frequency core circuit in response to determining that the slave address does not identify the slave device. According to some embodiments, the control circuit includes a slave address detector configured to control gating of the interface clock signal based on comparing the slave address to a device user identification of the slave device. In according with various embodiments, the control circuit further includes a start-up sequence identifier configured to prevent the slave address detector from gating the interface clock signal in response to detecting a start-up sequence of a second interface command received over the serial interface.

In a number of embodiments, the control circuit is configured to generate a gated register clock signal that controls the register bank, and the control circuit is configured to prevent the gated register clock signal from toggling until after the control circuit determines that the slave address identifies the slave device. In accordance with several embodiments, the first interface command includes a register write command frame and a data frame subsequent to the register write command frame, and the register write command frame includes the slave address and the data frame including the configuration data. According to various embodiments, the control circuit is further configured to prevent the gated register clock signal from toggling until the control circuit writes the configuration data to the register bank in response to determining that the slave address identifies the slave device.

In some embodiments, the control circuit is configured to cut off the interface clock signal from reaching the register bank in response to determining that the slave address does not identify the slave device.

In a number of embodiments, the control circuit is configured to cut off the interface clock signal from reaching the control circuit in response to determining that the slave address does not identify the slave device.

In various embodiments, the control circuit is configured to cut off the interface clock signal from reaching the shift register circuitry in response to determining that the slave address does not identify the slave device.

In some embodiments, the control circuit includes a finite state machine.

In several embodiments, the serial interface is a mobile industry processor interface radio frequency front-end bus.

In various embodiments, the serial interface is an inter-integrated circuit bus.

In a number of embodiments, the radio frequency core circuit includes at least one power amplifier.

In several embodiments, the radio frequency core circuit includes at least one low noise amplifier.

In various embodiments, the radio frequency core circuit includes at least one radio frequency switch.

In some embodiments, the radio frequency core circuit includes at least one radio frequency filter.

In certain embodiments, the present disclosure relates to a method of communicating using a serial interface. The method includes receiving an interface clock signal and an interface data signal as inputs to a slave device of the serial interface, receiving a first interface command over the serial interface, shifting in the interface data signal using shift register circuitry of the slave device, controlling the shift register circuitry and a register bank of the slave device using a control circuit of the slave device, determining whether or not the first interface command identifies the slave device using the control circuit, and gating the interface clock signal in response to determining that the first interface command does not identify the slave device.

In some embodiments, the method further includes programming configuration data associated with the first interface command to the register bank in response to determining that the first interface command is a register write command that identifies the slave device. According to various embodiments, the method further includes using the configuration data to control values of one or more analog control signals. In accordance with several embodiments, the method includes providing the one or more analog control signals to a radio frequency circuit.

In certain embodiments, the present disclosure relates to a slave device of a serial interface. The slave device includes a register bank configured to store configuration data received from an interface data signal of the serial interface, shift register circuitry configured to shift in the interface data signal, and a control circuit configured to receive the interface data signal and an interface clock signal of the serial interface, and to control operation of the shift register circuitry and the register bank. The control circuit is further configured to gate the interface clock signal in response to determining that a slave address of a first interface command received over the serial interface does not identify the slave device.

In a number of embodiments, the control circuit is further configured to generate a gated clock signal from the interface clock signal, and the gated clock signal operable to control the shift register circuitry, the control circuit, and the register bank.

In various embodiments, the control circuit is further configured to prevent the gated clock signal from toggling to reduce clock noise in response to determining that the slave address does not identify the slave device. According to some embodiments, the control circuit includes a slave address detector configured to control gating of the interface clock signal based on comparing the slave address to a device user identification of the slave device. In accordance with several embodiments, the control circuit further includes a start-up sequence identifier configured to prevent the slave address detector from gating the interface clock signal in response to detecting a start-up sequence of a second interface command received over the serial interface.

In a number of embodiments, the control circuit is configured to generate a gated register clock signal that controls the register bank, and the control circuit is configured to prevent the gated register clock signal from toggling until after the control circuit determines that the slave address identifies the slave device. According to several embodiments, the first interface command includes a register write command frame and a data frame subsequent to the register write command frame, and the register write command frame includes the slave address and the data frame includes the configuration data. In accordance with various embodiments, the control circuit is further configured to prevent the gated register clock signal from toggling until the control circuit writes the configuration data to the register bank in response to determining that the slave address identifies the slave device.

In some embodiments, the control circuit is configured to cut off the interface clock signal from reaching the register bank in response to determining that the slave address does not identify the slave device.

In a number of embodiments, the control circuit is configured to cut off the interface clock signal from reaching the control circuit in response to determining that the slave address does not identify the slave device.

In several embodiments, the control circuit is configured to cut off the interface clock signal from reaching the shift register circuitry in response to determining that the slave address does not identify the slave device.

In various embodiments, the control circuit includes a finite state machine.

In a number of embodiments, the serial interface is a mobile industry processor interface radio frequency front-end bus.

In some embodiments, the serial interface is an inter-integrated circuit bus.

In certain embodiments, the present disclosure relates to a radio frequency system. The radio frequency system includes a serial interface, a radio frequency integrated circuit including a master device of the serial interface, the master device configured to generate a first interface command including a slave address, and a first radio frequency component including a first slave device of the serial interface. The first slave device is configured to receive an interface clock signal and an interface data signal of the serial interface. The first slave device includes a register bank configured to store configuration data received from the interface data signal, shift register circuitry configured to shift in the interface data signal, and a control circuit configured to control operation of the shift register circuitry and the register bank. The control circuit is configured to gate the interface clock signal in response to determining that the slave address of the first interface command does not identify the first slave device In various embodiments, the first radio frequency component further includes a radio frequency core circuit and an energy management core circuit that includes the first slave device. The energy management core circuit is configured to provide the radio frequency core circuit with one or more analog control signals that are controllable by the configuration data.

In a number of embodiments, the control circuit is further configured to generate a gated clock signal from the interface clock signal, and the gated clock signal is operable to control the shift register circuitry, the control circuit, and the register bank. According to some embodiments, the control circuit is further configured to prevent the gated clock signal from toggling to inhibit noise from reaching the radio frequency core circuit in response to determining that the slave address does not identify the first slave device. In accordance with several embodiments, the control circuit includes a slave address detector configured to control gating of the interface clock signal based on comparing the slave address to a device user identification of the first slave device. According to various embodiments, the control circuit further includes a start-up sequence identifier configured to prevent the slave address detector from gating the interface clock signal in response to detecting a start-up sequence of a second interface command received over the serial interface from the master device.

In some embodiments, the radio frequency core circuit includes at least one power amplifier.

In various embodiments, the radio frequency core circuit includes at least one low noise amplifier.

In a number of embodiments, the radio frequency core circuit includes at least one radio frequency switch.

In several embodiments, the radio frequency core circuit includes at least one radio frequency filter.

In some embodiments, the radio frequency system further includes a second radio frequency component including a second slave device of the serial interface.

In a number of embodiments, the control circuit is further configured to generate a gated register clock signal that controls the register bank, and to prevent the gated register clock signal from toggling until after the control circuit determines that the slave address identifies the first slave device. According to several embodiments, the first interface command includes a register write command frame and a data frame subsequent to the register write command frame, and the register write command frame includes the slave address and the data frame includes the configuration data. In accordance with various embodiments, the control circuit is further configured to prevent the gated register clock signal from toggling until the control circuit writes the configuration data to the register bank in response to determining that the slave address identifies the first slave device.

In several embodiments, the control circuit is configured to cut off the interface clock signal from reaching the register bank in response to determining that the slave address does not identify the first slave device.

In a number of embodiments, the control circuit is configured to cut off the interface clock signal from reaching the control circuit in response to determining that the slave address does not identify the first slave device.

In various embodiments, the control circuit is configured to cut off the interface clock signal from reaching the shift register circuitry in response to determining that the slave address does not identify the first slave device.

In some embodiments, the control circuit includes a finite state machine.

In a number of embodiments, serial interface is a mobile industry processor interface radio frequency front-end bus.

In several embodiments, the serial interface is an inter-integrated circuit bus.

In various embodiments, the radio frequency system is implemented in a mobile device.

In certain embodiments, the present disclosure relates to a radio frequency system. The radio frequency system includes a serial interface, a radio frequency integrated circuit including a master device of the serial interface operable to generate an interface command identifying a slave address, and a first radio frequency component including a first slave device of the serial interface. The first slave device is configured to receive an interface clock signal and an interface data signal from the serial interface. The first slave device includes a register bank configured to store configuration data received from the interface data signal, a shift register configured to shift in the interface data signal, and a control circuit configured to control operation of the register bank. The control circuit is operable to gate the interface clock signal in response to determining that the slave address does not identify the first slave device.

In various embodiments, the first radio frequency component further includes a radio frequency core circuit and an energy management core circuit that includes the first slave device. The energy management core circuit is configured to provide the radio frequency core circuit with one or more analog control signals that are controllable by the configuration data.

In several embodiments, the first slave device further includes a clock distribution circuit controlled by the control circuit, the clock distribution circuit configured to generate a gated clock signal from the interface clock signal.

In a number of embodiments, the gated clock signal is operable to control timing of the shift register, the control circuit, and the register bank.

In some embodiments, the control circuit is further configured to prevent the gated clock signal from toggling to inhibit noise from reaching the radio frequency core circuit in response to determining that the slave address does not identify the first slave device.

In various embodiments, the control circuit includes a slave address detector configured to control gating of the interface clock signal based on comparing the slave address to a device user identification of the first slave device. According to several embodiments, the control circuit further includes a start-up sequence detector configured to prevent the slave address detector from gating the interface clock signal in response to detecting a start-up sequence of the serial interface.

In a number of embodiments, the clock distribution circuit is further configured to generate a gated register clock signal configured to control timing of the register bank, and the control circuit is configured to prevent the gated register clock signal from toggling until after the control circuit determines that the slave address identifies the first slave device. According to several embodiments, the interface command includes a register write command frame and a data frame subsequent to the register write command frame, and the register write command frame includes the slave address and the data frame includes the configuration data. In accordance with various embodiments, the control circuit is further configured to prevent the gated register clock signal from toggling until the control circuit writes the configuration data to the register bank in response to determining that the slave address identifies the first slave device.

In some embodiments, the radio frequency core circuit includes at least one power amplifier.

In various embodiments, the radio frequency core circuit includes at least one low noise amplifier.

In a number of embodiments, the radio frequency core circuit includes at least one radio frequency switch.

In some embodiments, the radio frequency core circuit includes at least one radio frequency filter.

In several embodiments, the radio frequency system further includes a second radio frequency component including a second slave device of the serial interface.

In a number of embodiments, the control circuit is configured to cut off the interface clock signal from reaching the register bank in response to determining that the slave address does not identify the first slave device.

In various embodiments, the control circuit is configured to cut off the interface clock signal from reaching the control circuit in response to determining that the slave address does not identify the first slave device.

In some embodiments, the control circuit is configured to cut off the interface clock signal from reaching the shift register in response to determining that the slave address does not identify the first slave device.

In several embodiments, the control circuit includes a finite state machine.

In a number of embodiments, the serial interface is a mobile industry processor interface radio frequency front-end bus.

In various embodiments, the serial interface is an inter-integrated circuit bus.

In some embodiments, the radio frequency system is implemented in a mobile device.

In certain embodiments, an integrated circuit for a radio frequency system is provided. The integrated circuit includes a radio frequency core circuit, and an energy management core circuit configured to provide the radio frequency core circuit with one or more analog control signals that are controllable by configuration data received over a serial interface. The energy management core circuit includes a slave device configured to receive an interface clock signal and an interface data signal from the serial interface. The slave device includes a register bank configured to store the configuration data, a shift register configured to shift in the interface data signal, and a control circuit configured to control operation of the register bank, the control circuit operable to gate the interface clock signal in response to determining that a slave address of an interface command received over the serial interface does not identify the slave device.

In several embodiments, the slave device further includes a clock distribution circuit controlled by the control circuit, and the clock distribution circuit is configured to generate a gated clock signal from the interface clock signal.

In various embodiments, the gated clock signal is operable to control timing of the shift register, the control circuit, and the register bank.

In a number of embodiments, the control circuit is further configured to prevent the gated clock signal from toggling to inhibit noise from reaching the radio frequency core circuit in response to determining that the slave address does not identify the slave device.

In several embodiments, the control circuit includes a slave address detector configured to control gating of the interface clock signal based on comparing the slave address to a device user identification of the slave device. According to various embodiments, the control circuit further includes a start-up sequence detector configured to prevent the slave address detector from gating the interface clock signal in response to detecting a start-up sequence of the serial interface.

In some embodiments, the clock distribution circuit is further configured to generate a gated register clock signal configured to control timing of the register bank, and the control circuit is configured to prevent the gated register clock signal from toggling until after the control circuit determines that the slave address identifies the slave device. According to a number of embodiments, the interface command includes a register write command frame and a data frame subsequent to the register write command frame, and the register write command frame including the slave address and the data frame includes the configuration data. In accordance with several embodiments, the control circuit is further configured to prevent the gated register clock signal from toggling until the control circuit writes the configuration data to the register bank in response to determining that the slave address identifies the slave device.

In a number of embodiments, the control circuit is configured to cut off the interface clock signal from reaching the register bank in response to determining that the slave address does not identify the slave device.

In several embodiments, the control circuit is configured to cut off the interface clock signal from reaching the control circuit in response to determining that the slave address does not identify the slave device.

In various embodiments, the control circuit is configured to cut off the interface clock signal from reaching the shift register in response to determining that the slave address does not identify the slave device.

In some embodiments, the control circuit includes a finite state machine.

In several embodiments, the serial interface is a mobile industry processor interface radio frequency front-end bus.

In a number of embodiments, the serial interface is an inter-integrated circuit bus.

In several embodiments, the radio frequency core circuit includes at least one power amplifier.

In various embodiments, the radio frequency core circuit includes at least one low noise amplifier.

In a number of embodiments, the radio frequency core circuit includes at least one radio frequency switch.

In several embodiments, the radio frequency core circuit includes at least one radio frequency filter.

In certain embodiments, the present disclosure relates to a slave device of a serial interface. The slave device includes a register bank configured to store configuration data received from an interface data signal of the serial interface, a shift register configured to shift in the interface data signal, and a control circuit configured to receive the interface data signal and an interface clock signal of the serial interface and to control operation of the register bank. The control circuit is operable to gate the interface clock signal in response to determining that a slave address of an interface command received over the serial interface does not identify the slave device.

In some embodiments, the slave device further includes a clock distribution circuit configured to generate a gated clock signal from the interface clock signal, and the clock distribution circuit is controlled by the control circuit.

In various embodiments, the gated clock signal is operable to control timing of the shift register, the control circuit, and the register bank.

In a number of embodiments, the control circuit is further configured to prevent the gated clock signal from toggling to reduce clock noise in response to determining that the slave address does not identify the slave device.

In several embodiments, the control circuit includes a slave address detector configured to control gating of the interface clock signal based on comparing the slave address to a device user identification of the slave device. According to a number of embodiments, the control circuit further includes a start-up sequence detector configured to prevent the slave address detector from gating the interface clock signal in response to detecting a start-up sequence of the serial interface.

In various embodiments, the clock distribution circuit is further configured to generate a gated register clock signal configured to control the register bank, and the control circuit is operable to prevent the gated register clock signal from toggling until after the control circuit determines that the slave address identifies the slave device. According to some embodiments, the interface command includes a register write command frame and a data frame subsequent to the register write command frame, and the register write command frame includes the slave address and the data frame includes the configuration data. In accordance with a number of embodiments, the control circuit is further configured to prevent the gated register clock signal from toggling until the control circuit writes the configuration data to the register bank in response to determining that the slave address identifies the slave device.

In several embodiments, the control circuit is configured to cut off the interface clock signal from reaching the register bank in response to determining that the slave address does not identify the slave device.

In a number of embodiments, the control circuit is configured to cut off the interface clock signal from reaching the control circuit in response to determining that the slave address does not identify the slave device.

In various embodiments, the control circuit is configured to cut off the interface clock signal from reaching the shift register in response to determining that the slave address does not identify the slave device.

In several embodiments, the control circuit includes a finite state machine.

In some embodiments, the serial interface is a mobile industry processor interface radio frequency front-end bus.

In a number of embodiments, the serial interface is an inter-integrated circuit bus.

In certain embodiments, the present disclosure relates to a method of communicating using a serial interface. The method includes receiving an interface clock signal and an interface data signal as inputs to a slave device of the serial interface, shifting in the interface data signal using a shift register of the slave device, controlling a register bank of the slave device using a control circuit of the slave device, determining whether or not an interface command of the serial interface identifies the slave device using the control circuit, and gating the interface clock signal in response to determining that the interface command does not identify the slave device.

In various embodiments, the method further includes programming configuration data associated with the interface command to the register bank in response to determining that the interface command is a register write command that identifies the slave device.

In several embodiments, the method further includes using the configuration data to control values of one or more analog control signals. In accordance with a number of embodiments, the method further includes providing the one or more analog control signals to a radio frequency circuit.

BRIEF DESCRIPTION OF THE DRAWINGS

Embodiments of this disclosure will now be described, by way of non-limiting example, with reference to the accompanying drawings.

DETAILED DESCRIPTION OF EMBODIMENTS

Figure 1:
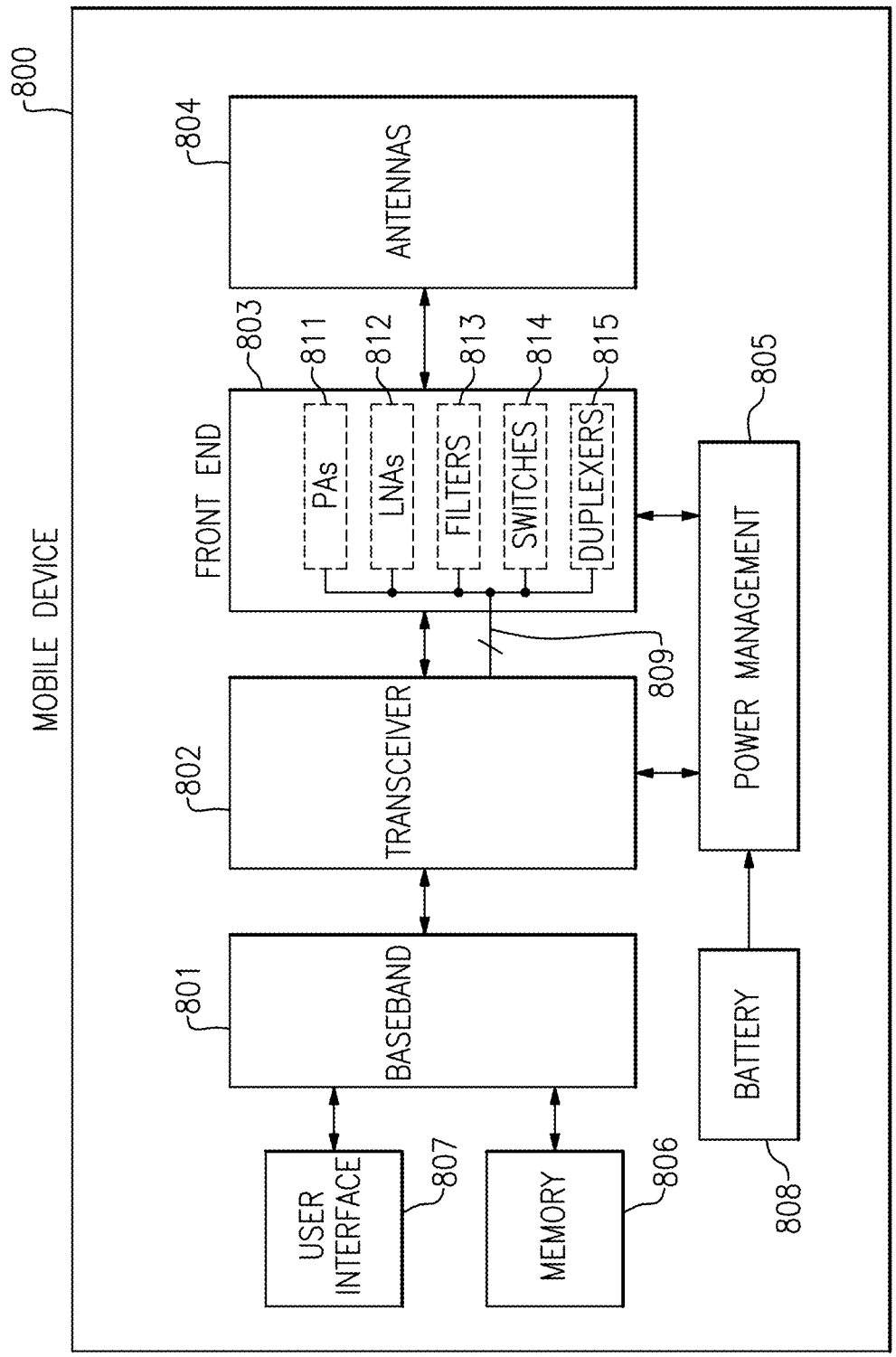
FIG. 1 is a schematic diagram of one embodiment of a mobile device.

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

A serial interface or bus can include a master device and one or more slave devices, which can be distributed across multiple integrated circuits (ICs). The master device can broadcast an interface command over the serial interface to the slave devices, such as an instruction to write a certain register associated with a particular slave device. To identify the selected slave device and register, a slave address and register identifier can be broadcasted over the interface as part of the interface command. Each slave device can analyze the slave address to determine if the interface command is designated for the slave device, and if so, the selected slave device uses the register identifier to locate the targeted register.

Examples of serial interfaces or buses include, but are not limited to, a mobile industry processor interface radio frequency front-end (MIPI RFFE) bus and an inter-integrated circuit ($I^2C$) bus.

A radio frequency (RF) system includes multiple RF components, which can also be referred to herein as RF blocks or modules. Examples of RF components for an RF system include, but are not limited to, power amplifiers, switches, couplers, low noise amplifiers (LNAs), and/or filters. Additionally, all or part of these RF components can be controlled by a shared serial interface or bus. Additionally, the serial interface can be used for sending interface commands to configure the system during initialization and/or while fully operational.

In certain implementations, one or more of the RF components can include an RF core circuit and an energy management (EM) core circuit. The RF core circuit can include one or more RF inputs connected to one or more RF outputs through highly sensitive signal paths. Additionally, the RF core circuit is controlled by the EM core circuit, such as by controlling the signal level of one or more analog control signals. For instance, the one or more analog controls can include, but are not limited to, bias currents, bias voltages, reference voltages, and/or controllable power supplies.

The EM core circuit can include a slave device that receives commands via the serial interface. For example, the serial interface can be used to program registers with configuration data that can be decoded to control the RF core circuit. The configuration data stored in the registers can include information for setting, for instance, one more analog control signal values, a power mode, a frequency band of operation, and/or a wide variety of other settings.

The slaves devices receive control telegrams (also referred to herein as interface commands) from a master device, which can be located, for instance, on an RFIC or transceiver die.

When the master device programs a specific RF component via the serial interface, all of the other RF components on the serial interface may also be exposed to transient switching activity of the serial interface's clock and data paths, even though the interface command is not directed toward these RF components.

The inventors have recognized that the switching activity of a serial interface generates current spikes at each edge transition, particularly for a clock path that feeds registers or flip-flops associated with the slave devices of the serial interface. Such current spikes cause ripple on the interface supply voltage (VIO), which can couple to an RF core circuit, including to RF inputs and/or RF outputs. The coupling can lead to generation of harmonic tones in the RF component's frequency spectrum, and a corresponding degradation of RF signaling performance. Moreover, clock noise of the serial interface can couple to RF core circuits through other paths, such as via a ground plane and/or from direct capacitive coupling from a clock tree.

Although decoupling capacitors can be added to the interface supply voltage (VIO) to reduce such noise, decoupling capacitors can increase die area and/or may not fully address all noise sources. Likewise, isolation stripes between an energy management core circuit and an RF core circuit can increase die area and/or complexity, and may not fully resolve all noise sources. Similarly, layout techniques, such as selection of the location of RF paths relative to noise sources, may be insufficient and/or infeasible in view of customer specifications with respect to pin placement.

Low noise serial interfaces with gated clock are provided herein. In certain configurations herein, a slave device of a serial interface includes a shift register for serially shifting in an interface data signal based on timing of an interface clock signal, a control circuit (for instance, a finite-state machine) for controlling the slave device, and a register bank for storing data programmed to the slave device via the serial interface. The control circuit cuts off or gates the interface clock signal in response to determining that an interface command received over the serial interface is not intended for the slave device.

Thus, noise arising from clocking various circuitry of the slave device, such as the register bank, is substantially decreased. In particular, when a particular slave device is not addressed by a given interface command, the slave device's finite-state machine or other control circuit gates the interface clock signal, thereby preventing toggling of the interface clock signal to the register bank. Thus, current spikes are substantially decreased for instances of a non-matching or invalid slave address.

FIG. 1 is a schematic diagram of one embodiment of a mobile device 800. The mobile device 800 includes a baseband system 801, a transceiver 802, a front end system 803, antennas 804, a power management system 805, a memory 806, a user interface 807, and a battery 808.

As shown in in FIG. 1, the transceiver 802 is connected to the front end system 803 using a serial interface 809 that is implemented in accordance with the teachings herein. All or part of the illustrated RF components can be controlled by the serial interface 809 to configure the mobile device 800 during initialization and/or while fully operational. Although an example in which a transceiver controls a serial interface is shown, other implementations are possible. For example, other systems can control a serial interface, including, but not limited to, base band systems and/or microcontrollers.

Although the mobile device 800 illustrates one example of an RF system that can include one or more features of the present disclosure, the teachings herein are applicable to electronic systems implemented in a wide variety of ways.

The mobile device 800 can be used communicate using a wide variety of communications technologies, including, but not limited to, 2G, 3G, 4G (including LTE, LTE-Advanced, and LTE-Advanced Pro), 5G, WLAN (for instance, Wi-Fi), WPAN (for instance, Bluetooth and ZigBee), WMAN (for instance, WiMax), and/or GPS technologies.

The transceiver 802 generates RF signals for transmission and processes incoming RF signals received from the antennas 804. It will be understood that various functionalities associated with the transmission and receiving of RF signals can be achieved by one or more components that are collectively represented in FIG. 1 as the transceiver 802. In one example, separate components (for instance, separate circuits or dies) can be provided for handling certain types of RF signals.

The front end system 803 aids is conditioning signals transmitted to and/or received from the antennas 804. In the illustrated embodiment, the front end system 803 includes power amplifiers (PAs) 811, low noise amplifiers (LNAs) 812, filters 813, switches 814, and duplexers 815. However, other implementations are possible.

For example, the front end system 803 can provide a number of functionalities, including, but not limited to, amplifying signals for transmission, amplifying received signals, filtering signals, switching between different bands, switching between different power modes, switching between transmission and receiving modes, duplexing of signals, multiplexing of signals (for instance, diplexing or triplexing), or some combination thereof.

In certain implementations, the mobile device 800 supports carrier aggregation, thereby providing flexibility to increase peak data rates. Carrier aggregation can be used for both Frequency Division Duplexing (FDD) and Time Division Duplexing (TDD), and may be used to aggregate a plurality of carriers or channels. Carrier aggregation includes contiguous aggregation, in which contiguous carriers within the same operating frequency band are aggregated. Carrier aggregation can also be non-contiguous, and can include carriers separated in frequency within a common band or in different bands.

The antennas 804 can include antennas used for a wide variety of types of communications. For example, the antennas 804 can include antennas for transmitting and/or receiving signals associated with a wide variety of frequencies and communications standards.

In certain implementations, the antennas 804 support MIMO communications and/or switched diversity communications. For example, MIMO communications use multiple antennas for communicating multiple data streams over a single radio frequency channel. MIMO communications benefit from higher signal to noise ratio, improved coding, and/or reduced signal interference due to spatial multiplexing differences of the radio environment. Switched diversity refers to communications in which a particular antenna is selected for operation at a particular time. For example, a switch can be used to select a particular antenna from a group of antennas based on a variety of factors, such as an observed bit error rate and/or a signal strength indicator.

The mobile device 800 can operate with beamforming in certain implementations. For example, the front end system 803 can include phase shifters having variable phase controlled by the transceiver 802. Additionally, the phase shifters are controlled to provide beam formation and directivity for transmission and/or reception of signals using the antennas 804. For example, in the context of signal transmission, the phases of the transmit signals provided to the antennas 804 are controlled such that radiated signals from the antennas 804 combine using constructive and destructive interference to generate an aggregate transmit signal exhibiting beam-like qualities with more signal strength propagating in a given direction. In the context of signal reception, the phases are controlled such that more signal energy is received when the signal is arriving to the antennas 804 from a particular direction. In certain implementations, the antennas 804 include one or more arrays of antenna elements to enhance beamforming.

The baseband system 801 is coupled to the user interface 807 to facilitate processing of various user input and output (I/O), such as voice and data. The baseband system 801 provides the transceiver 802 with digital representations of transmit signals, which the transceiver 802 processes to generate RF signals for transmission. The baseband system 801 also processes digital representations of received signals provided by the transceiver 802. As shown in FIG. 1, the baseband system 801 is coupled to the memory 806 of facilitate operation of the mobile device 800.

The memory 806 can be used for a wide variety of purposes, such as storing data and/or instructions to facilitate the operation of the mobile device 800 and/or to provide storage of user information.

The power management system 805 provides a number of power management functions of the mobile device 800. In certain implementations, the power management system 805 includes a PA supply control circuit that controls the supply voltages of the power amplifiers 811. For example, the power management system 805 can be configured to change the supply voltage(s) provided to one or more of the power amplifiers 811 to improve efficiency, such as power added efficiency (PAE).

As shown in FIG. 1, the power management system 805 receives a battery voltage from the battery 808. The battery 808 can be any suitable battery for use in the mobile device 800, including, for example, a lithium-ion battery.

Figure 2:
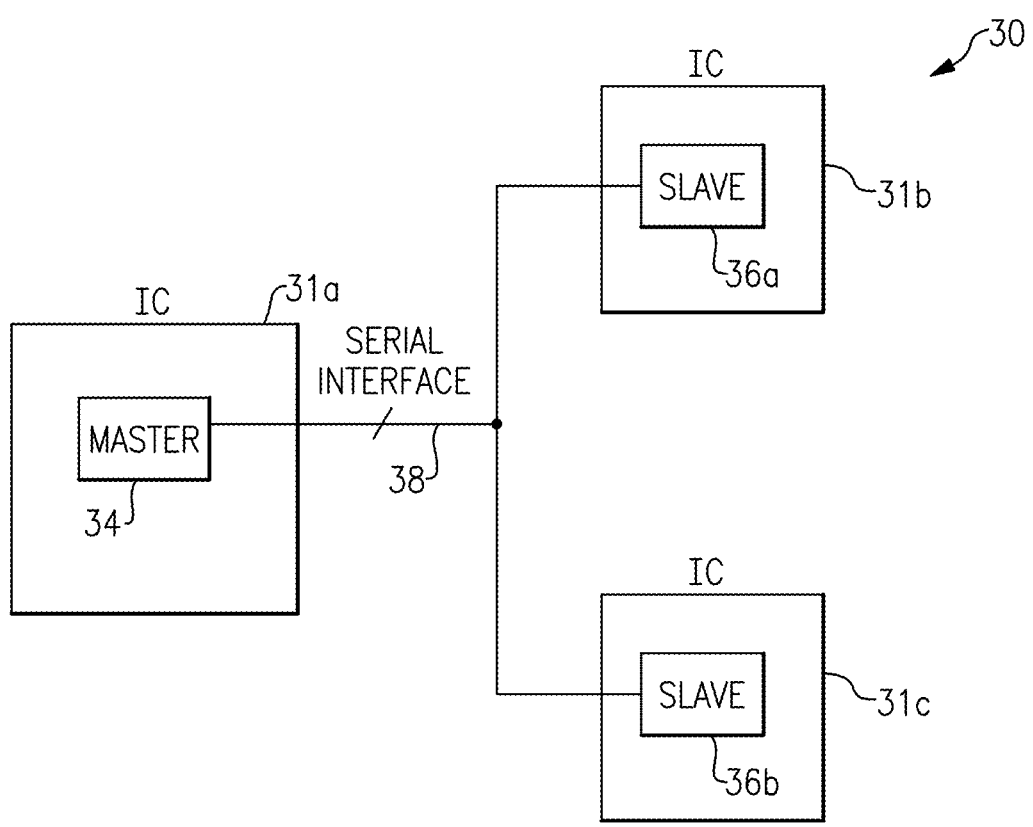
FIG. 2 is a schematic diagram of one example of an electronic system including a serial interface.

FIG. 2 is a schematic diagram of one example of an electronic system 30 that can include a low noise serial interface with gated clock. As shown in FIG. 2, the electronic system 30 includes a first IC 31*a*, a second IC 31*b*, a third IC 31*c*, and a serial interface 38. The first IC 31*a* includes a master device 34, the second IC 31*b* includes a first slave device 36*a*, and the third IC 31*c* includes a second slave device 36*b*. The first, second and third ICs 31*a*-31*c* are electrically connected over the serial interface 38, which can be, for example, a MIPI RFFE interface, an I²C interface, or any other suitable interface or bus.

Although the electronic system 30 is illustrated for the case of three ICs, the electronic system 30 can be adapted to include more or fewer ICs. Additionally, although only one slave device is illustrated on each of the second and third ICs 31*b*, 31*c*, the second and/or third IC can include additional slave devices.

The electronic system 30 can be, for example, an RF system incorporated in a smartphone, a base station, a handset, a wearable electronic device, or a tablet. In one example, the first IC 31 corresponds to an RFIC or transceiver, the second IC 31*b* corresponds to a first RF component (for instance, a power amplifier), and the third IC 31*c* corresponds to a second RF component (for instance, RF switches). Although one example of components for the serial interface 38 has been described, other implementations are possible.

Figure 3:
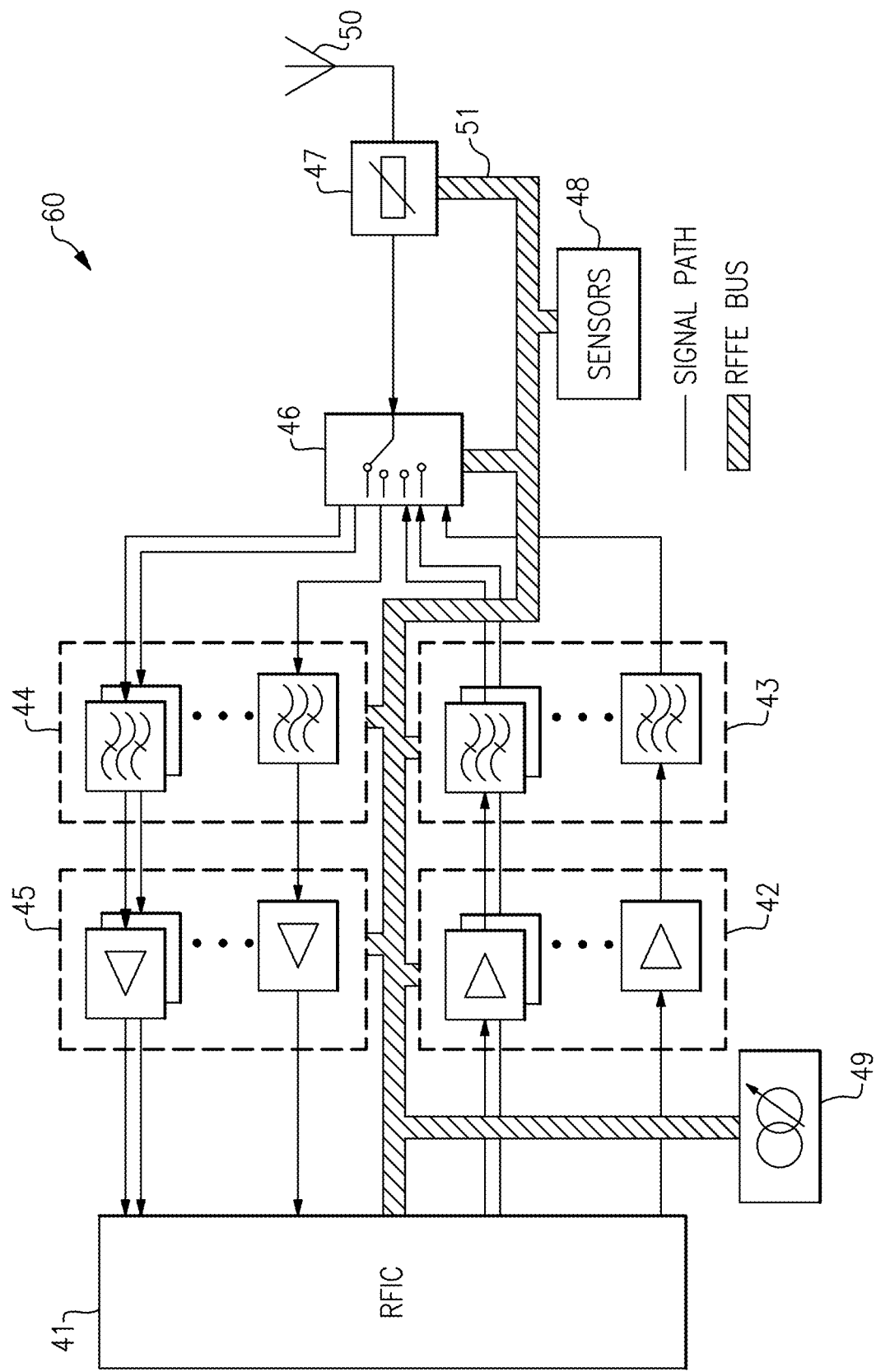
FIG. 3 is a schematic diagram of one embodiment of an RF system including a MIPI RFFE interface.

FIG. 3 is a schematic diagram of one embodiment of an RF system 60 including a MIPI RFFE interface or bus 51. The RF system 60 further includes an RFIC 41, a power amplifier module 42, a transmit filter module 43, a receive filter module 44, a low noise amplifier (LNA) module 45, an antenna switch module 46, a coupler module 47, a sensor module 48, a biasing module 49, and an antenna 50.

As shown in FIG. 3, various components of the RF system 60 are interconnected by the MIPI RFFE bus 51. Additionally, the RFIC 41 includes a master device of the MIPI RFFE bus 51, and each of the RF components includes a slave device of the MIPI RFFE bus 51. The master device of the RFIC 41 sends interface commands over the MIPI RFFE bus 51 to configure the RF system 60 during initialization and/or while fully operational.

Although FIG. 3 illustrates one example of an RF system that can include RF components controlled over a serial interface, such as a MIPI RFFE bus, the teachings herein are applicable to RF systems implemented in a wide variety of ways.

Figure 4A:
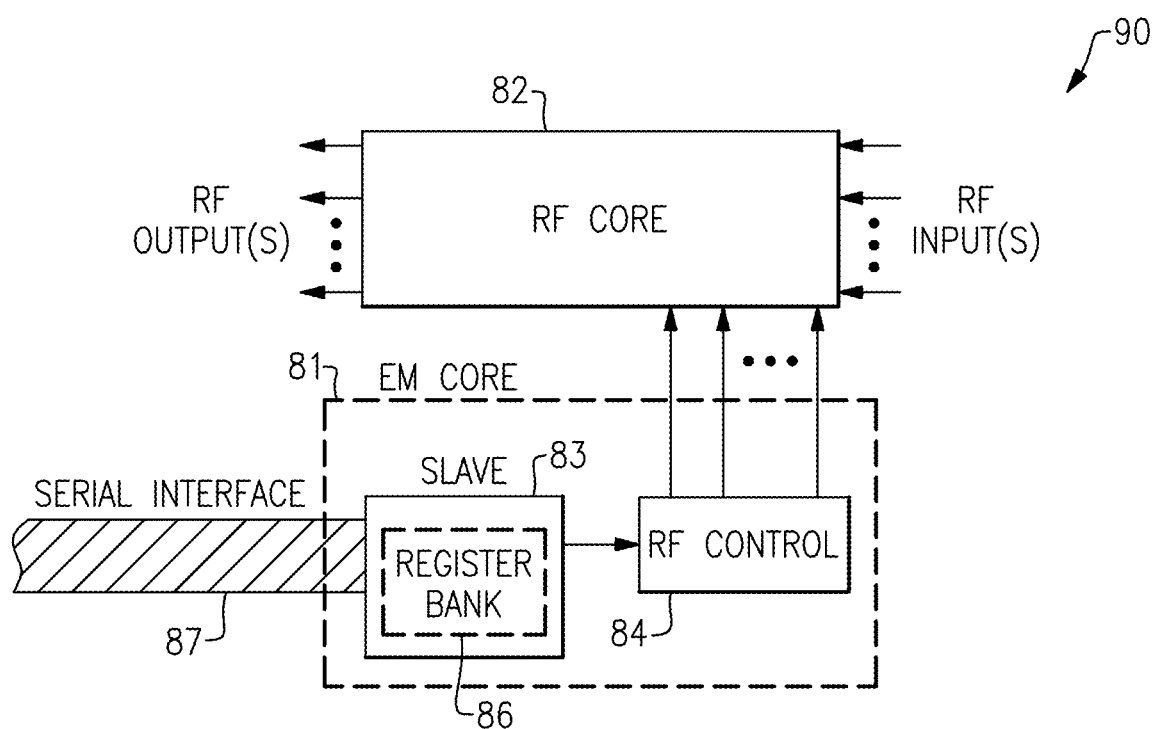
FIG. 4A is a schematic diagram of one embodiment of an RF module including a slave device of a serial interface.

FIG. 4A is a schematic diagram of one embodiment of an RF module 90 including a slave device of a serial interface. The RF module 90 includes an energy management (EM) core circuit 81 and an RF core circuit 82. The RF module 90 can represent any of the RF modules or components of FIG. 3. For example, the RF core circuit 82 can represent power amplifier circuitry, low noise amplifier circuitry, switch circuitry, filter circuitry, and/or a wide variety of RF circuitry.

In the illustrated embodiment, the EM core circuit 81 includes a slave device 83 and an RF control circuit 84. The slave device 83 includes a register bank 86, which stores configuration data received over a serial interface 87.

The RF control circuit 84 generates one or more control signals for controlling the EM core circuit 81. In certain implementations, at least one of the control signals has an analog signal value that is controlled based on data received over the serial interface and stored in the register bank 86.

The serial interface 87 includes interface signals (for instance, an interface clock signal and an interface data signal) which are common or shared by the slave devices of the serial interface 87. For example, as shown in FIG. 2, a serial interface can include two or more slave devices that are controlled by a master device. In certain implementations, the serial interface 87 also provides at least one power supply voltage to the slave devices.

The slave device 83 has a unique slave address used for identification. Thus, when a specific RF module is being programmed via the serial interface 87, other RF modules connected to the serial interface 87 are exposed to transient switching activity (for instance, toggling of the interface clock signal and the interface data signal), even though the interface command is not directed toward these RF modules.

The inventors have recognized that the switching activity of a serial interface generates current spikes at each edge transition. Such switching activity can lead to ripple on a supply voltage, glitches on a ground plane, and/or capacitive coupling to the RF core circuit 82, each of which can manifest as noise on the RF input(s) and/or RF output(s). The coupling can lead to generation of harmonic tones in the RF module's frequency spectrum, and a corresponding degradation in performance.

By implementing the slave device 83 in accordance with the teachings herein, current spikes can be substantially decreased. This, in turn, leads to reduced noise and superior performance of the RF core circuit 82.

Figure 4B:
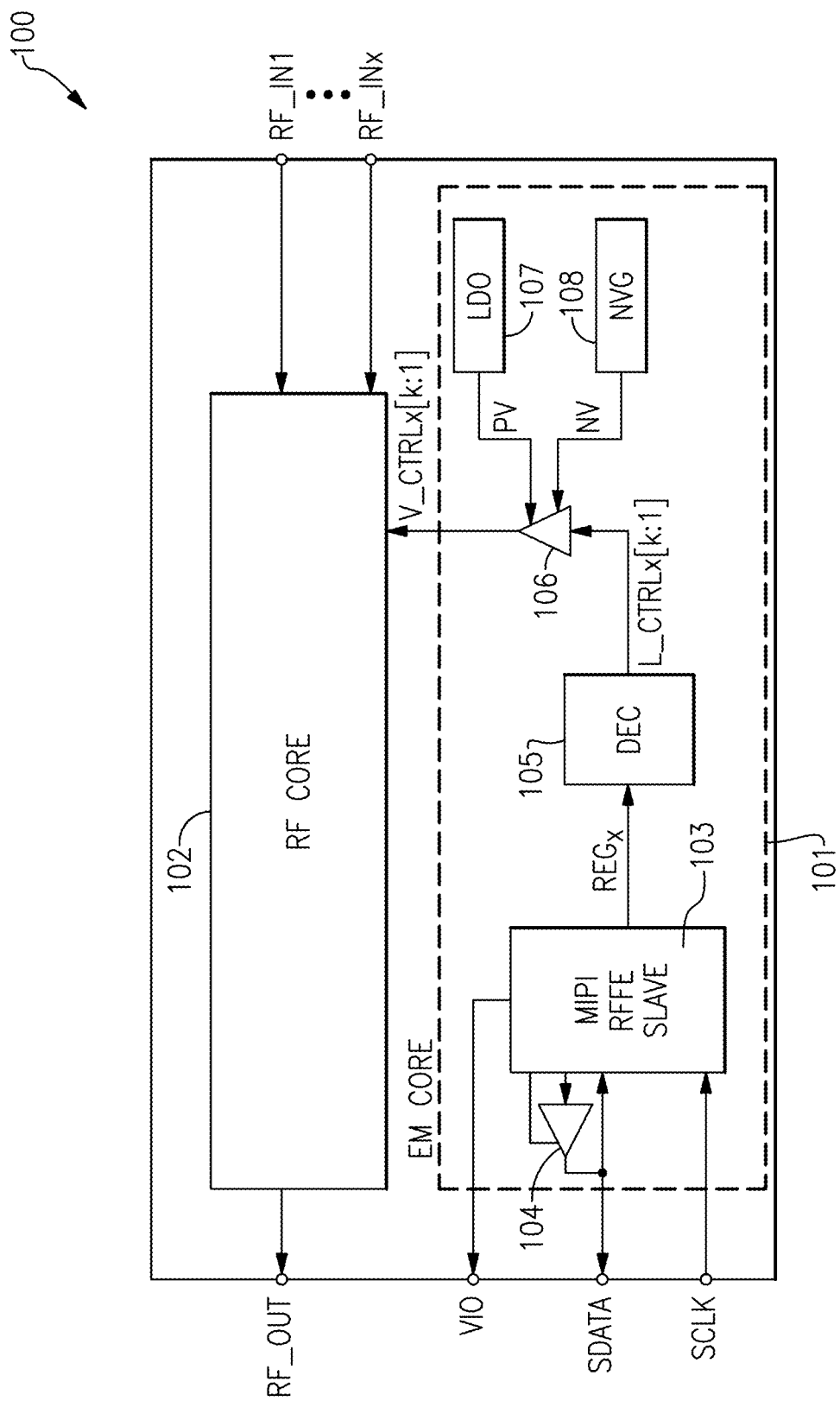
FIG. 4B is a schematic diagram of another embodiment of an RF module including a slave device of a MIPI RFFE interface.

FIG. 4B is a schematic diagram of one embodiment of an RF module 100 including a slave device of a MIPI RFFE interface. The RF module 100 includes an EM core circuit 101 and an RF core circuit 102.

In the illustrated embodiment, the EM core circuit 101 includes a MIPI RFFE slave device 103, a bus driver 104, a decoder 105, an analog control signal generator 106, a low dropout (LDO) regulator 107, and a negative voltage generator (NVG) 108. The MIPI RFFE slave device 103 is coupled to a MIPI RFFE bus including an interface clock signal (SCLK), an interface data signal (SDATA), and an interface supply voltage (VIO). Although one example of an energy management core circuit is shown, the teachings herein are applicable to energy management core circuits implemented in a wide variety of ways.

As shown in FIG. 4B, the illustrated RF core circuit 102 includes RF signal inputs RF_IN1 . . . RF_INx and an RF signal output RF_OUT. Additionally, the RF signal output RF_OUT is connected to the RF signal inputs RF_IN1 . . . RF_INx through noise sensitive signal paths of the RF core circuit 102. Although a specific example of inputs and outputs is shown, other implementations are possible, including implementations with other numbers of RF signal inputs and/or RF signal outputs.

The RF module 100 can represent any of the RF modules or components of FIG. 3. For example, the RF core circuit 102 can represent power amplifier circuitry, low noise amplifier circuitry, switch circuitry, filter circuitry, and/or a wide variety of RF circuitry.

With continuing reference to FIG. 4B, the RF core circuit 102 is controlled by the EM core circuit 101. For example, in the illustrated embodiment, the EM core circuit 101 generates analog control voltages (V_CTRLx[k:1]), which have analog voltage values controlled by data received over the serial interface. An example with an integer k analog control voltages is shown. An energy management control circuit can control an RF core circuit using any suitable number of analog control voltages and/or using other types of control signals. Thus, although a specific example of an RF module is shown in FIG. 4B, RF modules can be implemented in a wide variety of ways.

The EM core circuit 101 includes the MIPI RFFE slave device 103, which receives commands via the MIPI RFFE interface (SDATA/SCLK/VIO). For example, the serial interface can be used to program registers of the MIPI RFFE slave device 103 with configuration data, and the register outputs REG$_x$ can be decoded by the decoder 105 to generate logic control signals (L_CTRLx[k:1]) used to control values of the analog control voltages (V_CTRLx[k:1]). To aid in generating the analog control voltages, the analog control signal generator 106 receives a positive voltage PV from the LDO regulator 107 and a negative voltage NV from the NVG 108, in this embodiment.

The interface clock signal SCLK and interface data signal SDATA are common or shared by the slave devices of the MIPI RFFE interface. Additionally, each slave device has a unique slave address used for identification. Thus, when a specific RF module is being programmed via the MIPI RFFE interface, other RF modules of the MIPI RFFE interface are exposed to transient switching activity of the interface clock signal SCLK and interface data signal SDATA, even though the interface command is not directed toward these RF modules.

The inventors have recognized that the switching activity of a serial interface, such as the MIPI RFFE interface of FIG. 4B, generates current spikes at each edge transition.

For instance, with respect to the embodiment depicted in FIG. 4B, such current spikes generate voltage ripple on the interface supply voltage VIO, which can couple to the RF core circuit 102. For instance, noise can reach the RF signal output RF_OUT and/or the RF signal inputs RF_IN1 . . . RF_INx of the RF module 100. The coupling can lead to generation of harmonic tones in the RF module's frequency spectrum, and a corresponding degradation of performance.

Furthermore, clock noise of the MIPI RFFE interface can couple to the RF core circuit 102 through other mechanisms aside from ripple of the interface supply voltage VIO, such as via a ground plane or from direct capacitive coupling from a clock tree.

Figure 5:
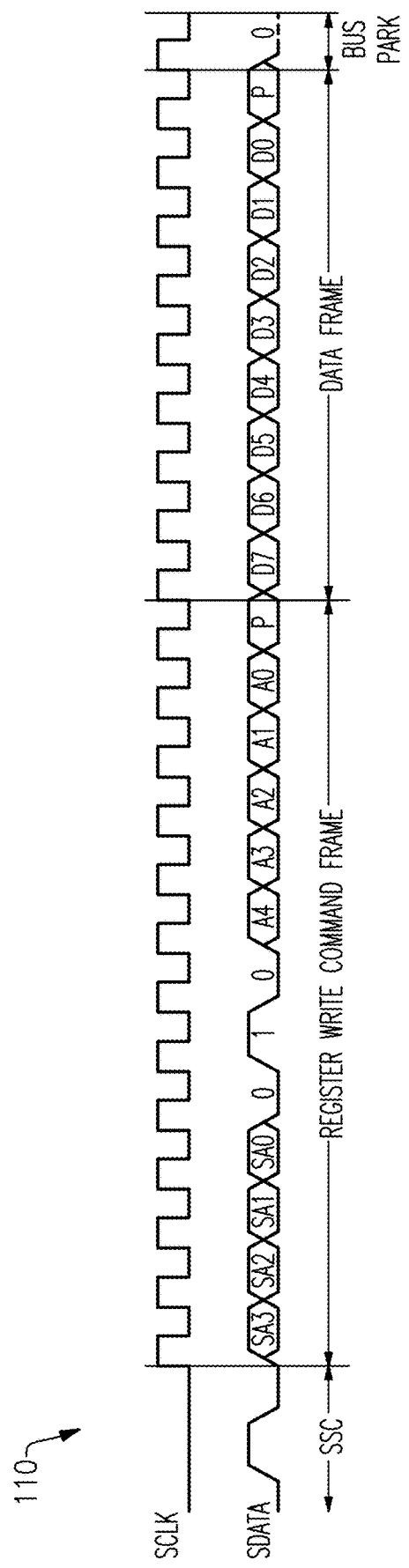
FIG. 5 is an example of a timing diagram for a MIPI RFFE interface.

FIG. 5 is an example of a timing diagram 110 for a MIPI RFFE interface. The timing diagram 110 schematically depicts one example of a programming sequence for an interface command of a MIPI RFFE interface.

As shown in FIG. 5, the programming sequence includes a start sequence (SSC), a command frame (register write, in this example), a data frame, and a bus park or termination sequence.

The command frame includes a slave address (four bits, in this example), which is used to identify a particular slave device of the interface. For example, the transmitted value of the slave address can correspond to a particular slave device's user ID (USID). The command frame further includes a command type (three bits, in this example). In the timing diagram 110, the command type is designated using bits 010, corresponding to a register write, in this example. The command frame further includes a register address (five bits, in this example), and command frame parity data (one bit, in this example).

As shown in FIG. 5, the data frame includes register data (eight bits, in this example). Additionally, the data frame further includes data frame parity data (one bit, in this example).

Although one example of a timing diagram for a serial interface is illustrated in FIG. 5, the teachings herein are applicable to serial interfaces using a wide variety of interface commands.

Figure 6A:
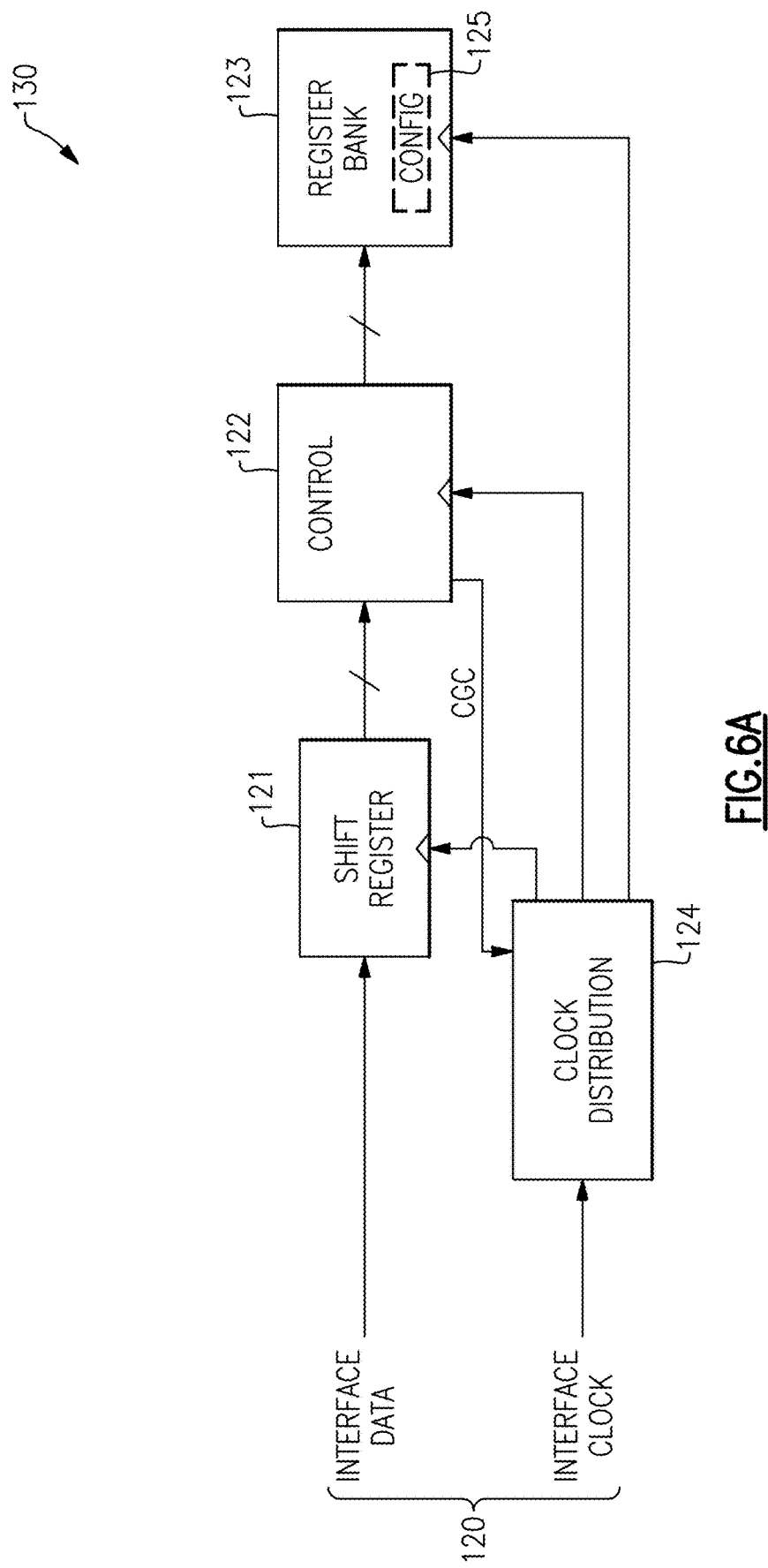
FIG. 6A is a schematic diagram of one embodiment of a slave device for a serial interface.

FIG. 6A is a schematic diagram of one embodiment of a slave device 130 for a serial interface 120. The slave device 130 includes a shift register 121, a control circuit 122, a resister bank 123, and a clock distribution circuit 124. As shown in FIG. 6A, the slave device 130 is connected to the serial interface 120 having an interface data signal and an interface clock signal.

In the illustrated embodiment, the shift register 121 is operable to shift in the interface data signal, thereby converting the received serial data into a parallel word.

The control circuit 122 controls various functionality of the slave device 130, including for example, reading and writing of the register bank 123 as well as clock gating of the interface clock signal.

With continuing reference to FIG. 6A, the register bank 123 is used to store the programmed device configuration or configuration data 125 of the slave device 130.

The clock distribution circuit 124 is used to distribute the interface clock signal to one or more circuits of the slave device 130, such as the shift register 121, the control circuit 122, and/or the register bank 123. Although illustrated as providing a separate clock signal to the shift register 121, the control circuit 122, and/or the register bank 123, the clock distribution circuit 124 can generate more or fewer clock signals for distribution. For example, in certain implementations, the shift register 121, the control circuit 122, and/or the register bank 123 and/or share one or more clock signals.

As shown in FIG. 6A, the clock distribution circuit 124 receives one or more clock gating control (CGC) signals form the control circuit 122. The clock gating control signals are used to control clock gating, thereby selectively inhibiting one or more of the distributed clock signals from toggling. For example, in certain configurations, when the control circuit 122 gates a particular distributed clock signal, that clock signal is preventing from toggling even when the interface clock signal is toggling. In certain implementations, the clock distribution circuit 124 includes digital logic gates used for gating the interface clock signal based on one or more clock gating control signals from the control circuit 122.

The control circuit 122 can be used to control the clock distribution circuit 124 to gate or cut off the interface clock signal once the control circuit 122 determines that the slave address of a particular command received on the serial interface does not correspond to the identifier associated with the slave device 130.

By cutting off the interface clock signal in this manner, noise associated with clocking is substantially reduced when the interface command is not intended for the slave device 130.

By implementing the slave device 130 with clock gating, current spikes can be substantially decreased. This, in turn, leads to reduced noise and superior performance of RF circuitry fabricated on-chip with the slave device 130. In contrast, a slave device operating without clock gating can be susceptible to coupling that can generate harmonic tones, which in turn degrade RF performance.

Figure 6B:
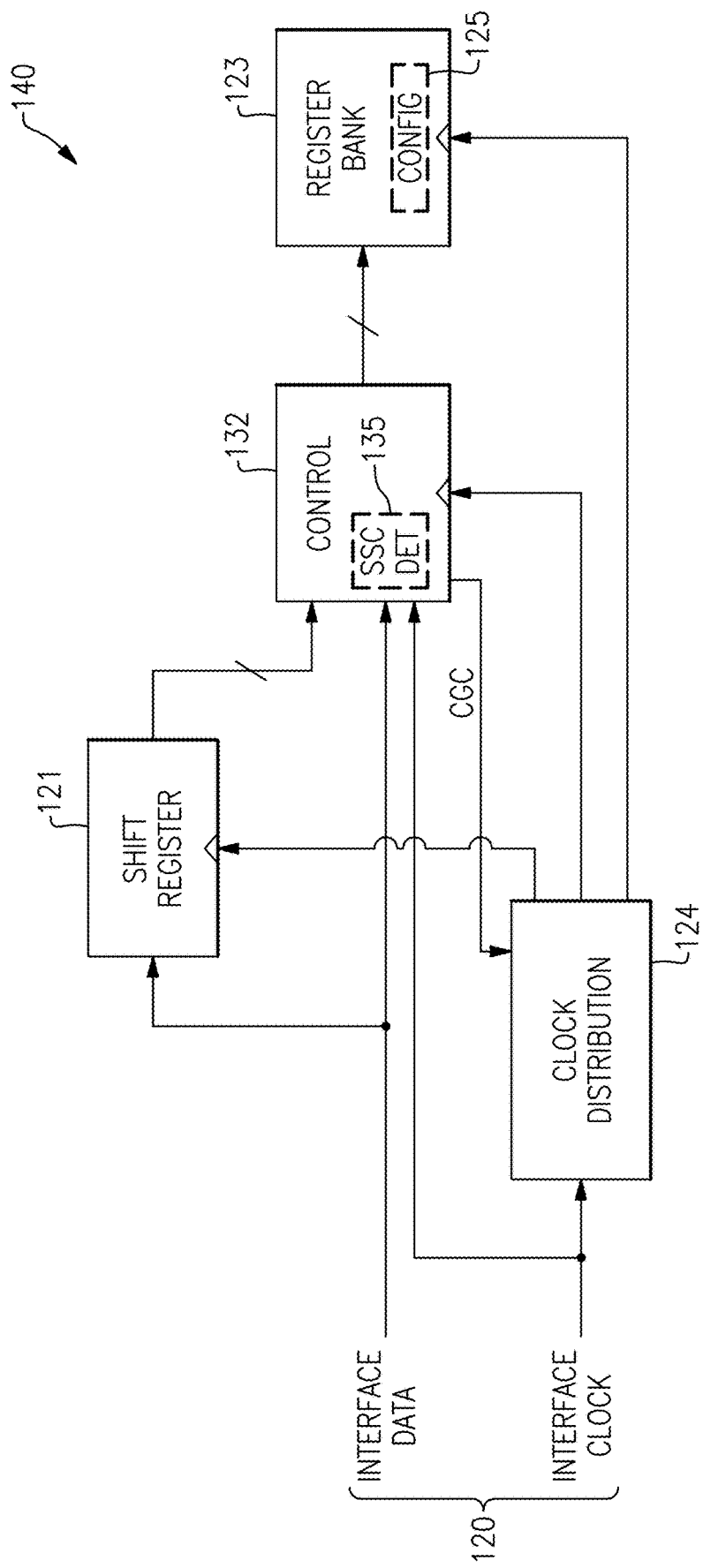
FIG. 6B is a schematic diagram of another embodiment of a slave device for a serial interface.

FIG. 6B is a schematic diagram of another embodiment of a slave device 140 for a serial interface 120. The slave device 140 includes a shift register 121, a control circuit 132, a resister bank 123, and a clock distribution circuit 124.

The slave device 140 of FIG. 6B is similar to the slave device 130 of FIG. 6A, except that the control circuit 132 of the slave device 140 includes a start-up sequence detector or SSC DET 135. The start-up sequence detector 135 receives the interface data signal and the interface clock signal, and is used to detect when a new interface command has been initiated on the slave interface 120. When a start-up sequence is detected, the control circuit 132 turns off clock gating to at least the shift register 121 such that the shift register 121 can shift in data associated with the new interface command.

Figure 6C:
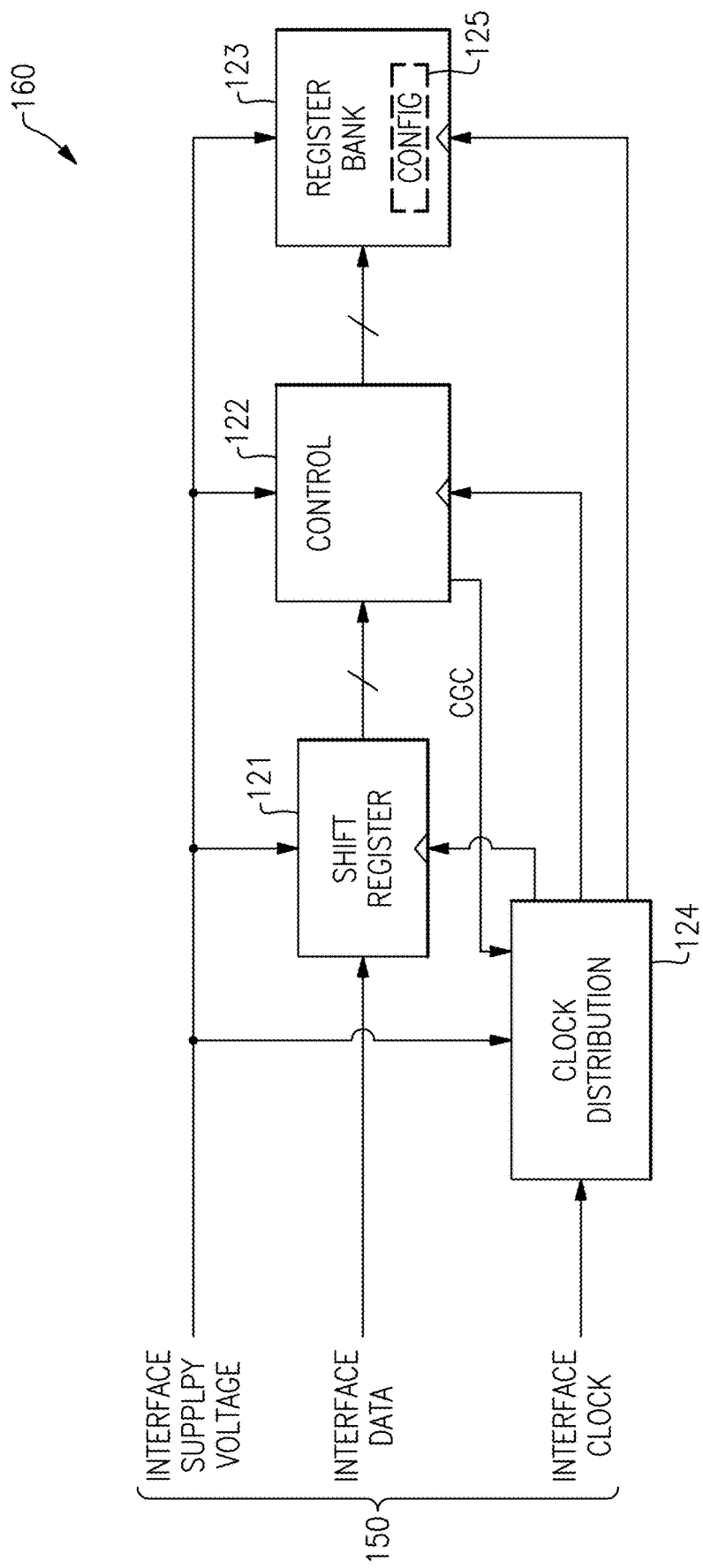
FIG. 6C is a schematic diagram of another embodiment of a slave device for a serial interface.

FIG. 6C is a schematic diagram of another embodiment of a slave device 160 for a serial interface 150. The slave device 160 of FIG. 6C is similar to the slave device 130 of FIG. 6A, except that the slave device 160 is connected to a serial interface 150 that provides an interface supply voltage.

As shown in FIG. 6C the interface supply voltage is used to power various circuitry of the slave device 160. In the illustrated example, the interface supply voltage provides power to the shift register 121, the control circuit 122, the register bank 123, and the clock distribution circuit 124. However, other implementations are possible, such as configurations in which certain circuitry of the slave device 160 is powered using an isolated supply voltage.

Any of the serial interfaces herein can be implemented to provide a supply voltage to one or more slave devices.

Figure 7A:
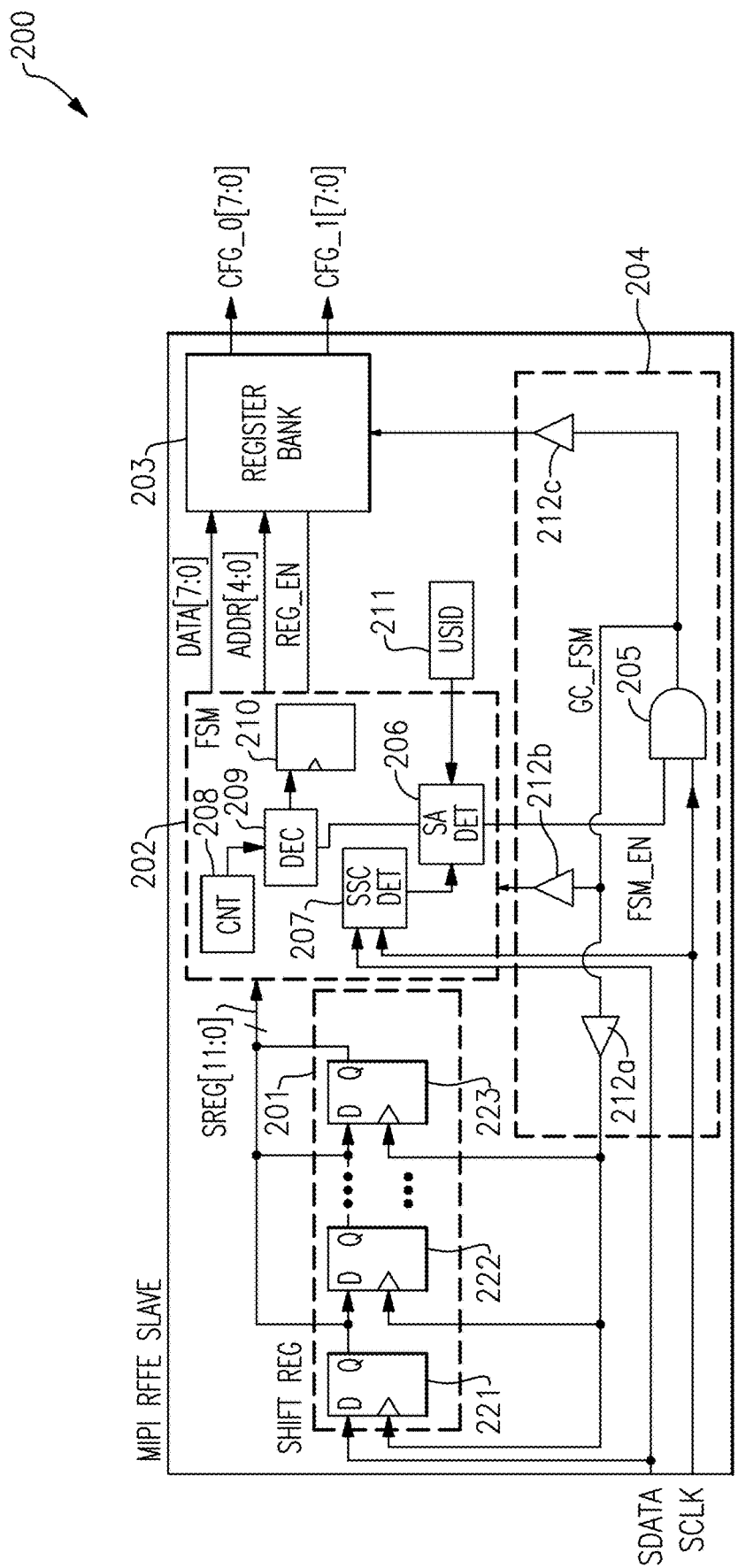
FIG. 7A is a schematic diagram of one embodiment of a slave device for a MIPI RFFE interface.

FIG. 7A is a schematic diagram of one embodiment of a slave device 200 for a MIPI RFFE interface. The slave device 200 includes a shift register 201, a finite state machine (FSM) 202, a resister bank 203, a clock distribution circuit or clock tree 204, and a USID 211. Although not illustrated in FIG. 7A, the slave device 200 receives power from an interface supply voltage VIO.

The shift register 201 is operable to shift in the interface data signal SDATA, thereby converting the received serial data into a parallel word. In the illustrated embodiment, the shift register 201 includes a plurality of flip-flops 221, 222, . . . 223 electrically connected in series. In one implementation, the shift register 201 includes twelve flip-flops in series, and the shift register generates a twelve bit shift register output signal SREG[11:0]. However, other implementations are possible, including implementations using more or fewer flip-flops and/or bits.

The FSM 202 controls the slave device 200 (including, for example, reading and writing of the register bank 203), and includes a slave address detector 206, a start-up sequence detector 207, a counter 208, a decoder 209, and flip-flops 210, in this embodiment. Although one specific implementation of an FSM is shown, other implementations of FSMs are possible. Furthermore, although an example of a slave device including an FSM is shown, the teachings herein are applicable to slave devices implemented using other types of control circuits.

The register bank 203 is used to store the programmed device configuration or configuration data of the slave device 200. In certain implementations, the register bank 203 can include one hundred or more flip-flops.

The illustrated clock distribution circuit 204 includes a clock gating circuit 205 (a logical AND gate, in this example), a first clock buffer 212a, a second clock buffer 212b, and a third clock buffer 212c. The clock distribution circuit 204 is used to distribute the interface clock signal SCLK to the shift register 201, the FSM 202, and the register bank 203. Although one specific implementation of a clock distribution circuit is shown, the teachings herein are applicable to clock distribution circuits implemented in a wide variety of ways.

In the illustrated embodiment, the FSM 202 controls the clock gating circuit 205 of the clock distribution circuit 204 to gate or cut off the interface clock signal SCLK once the FSM 202 determines that the slave address does not correspond to the USID 211 associated with the slave device 200. For example, the slave address detector 206 can be used to generate a clock gating control signal FSM_EN based on detecting whether or not one or more slave address bits (for instance, SA3, SA2, SA1, SA0 of FIG. 5) do not match corresponding bits of the USID 211. Additionally, the clock gating control signal FSM_EN is provided to the clock gating circuit 205, which generates a gated clock signal GC_FSM for distribution to the slave device's circuitry (to the shift register 201, the FSM 202, and the register bank 203, in this embodiment).

By cutting off the interface clock signal SCLK in this manner, noise associated with clocking is substantially reduced when the interface command is not intended for the slave device 200.

The comparison of the slave address to the USID 211 can be performed at a wide variety of time instances. In one example, the slave address detector 206 compares the slave address to the USID 211 after the command frame is shifted in by the shift register 201. In another example, the slave address detector 206 compares the slave address to the USID 211 before the command frame is fully shifted, but after the slave address bits have been received. In yet another example, the slave address detector 206 performs a bit-by-bit comparison of the USID 211 to each slave address bit as it is received, and gates the interface clock signal SCLK in response to determining that the slave device 200 is not being addressed.

By implementing the slave device 200 with clock gating, current spikes can be substantially decreased. This, in turn, leads to reduced noise and superior performance of RF circuitry fabricated on-chip with the slave device 200. In contrast, a slave device operating without clock gating can be susceptible to coupling of the interface supply voltage that can generate harmonic tones, which in turn degrade RF performance.

In the illustrated embodiment, the FSM 202 further includes the start-up sequence detector 207, which is used to detect when a new interface command has been initiated. The start-up sequence detector 207 can be used to reset the slave address detector 206 to allow the interface clock signal SCLK to reach the shift register 201. Thus, in response to the start-up sequence detector 207 detecting a new programming sequence, clock gating of the clock gating circuit 205 is turned off such that the shift register 201 can shift in data associated with the new interface command.

Figure 7B:
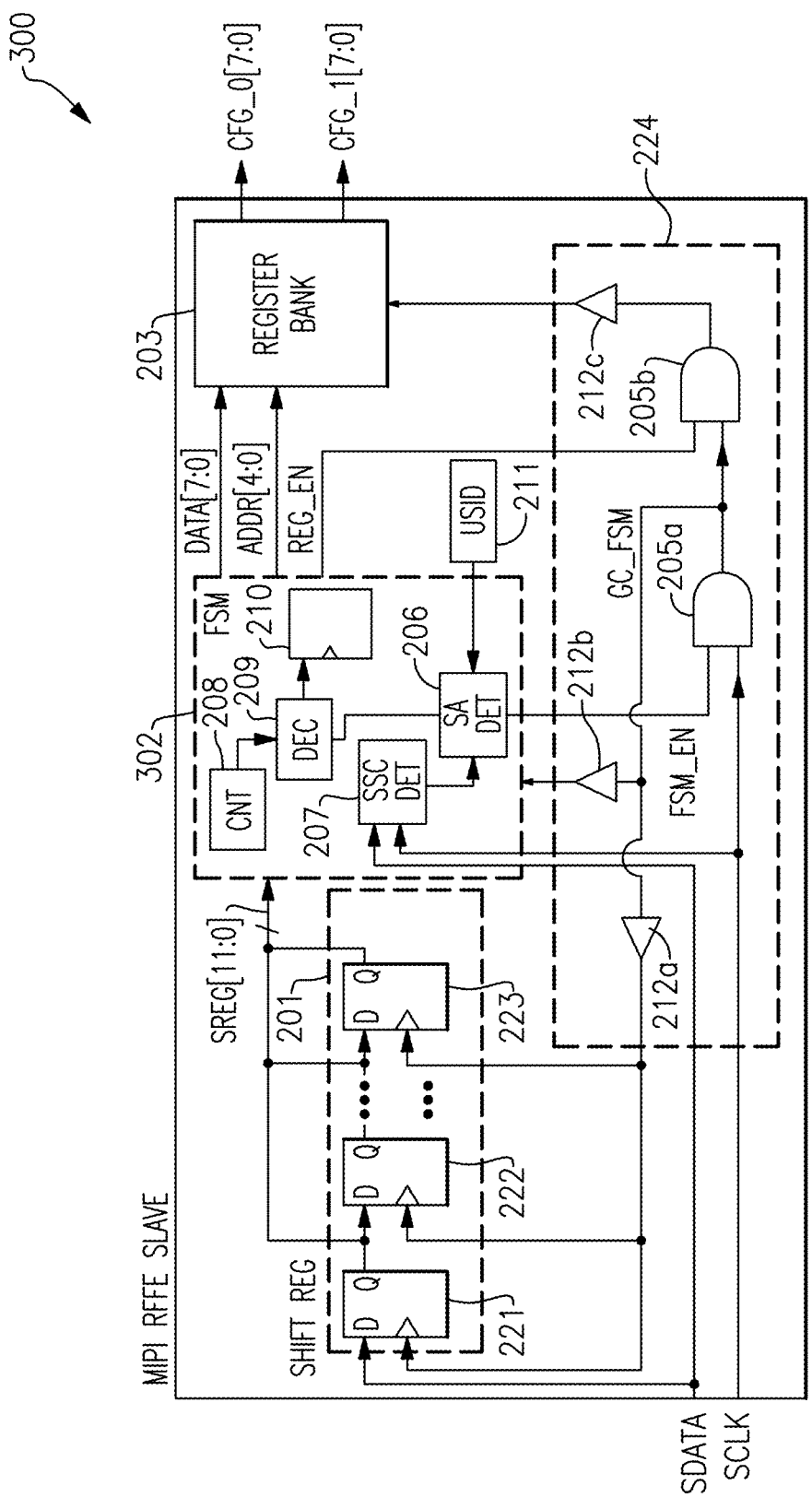
FIG. 7B is a schematic diagram of another embodiment of a slave device for a MIPI RFFE interface.

FIG. 7B is a schematic diagram of another embodiment of a slave device 300 for a MIPI RFFE interface. The slave device 300 includes a shift register 201, an FSM 302, a resister bank 203, a clock distribution circuit 224, and a USID 211. The illustrated clock distribution circuit 224 includes a first clock gating circuit 205a, a second clock gating circuit 205b, a first clock buffer 212a, a second clock buffer 212b, and a third clock buffer 212c.

The slave device 300 of FIG. 7B is similar to the slave device 200 of FIG. 7A, except that the slave device 300 provides an additional level of clock gating via the second clock gating circuit 205b. For example, in the illustrated embodiment, the first clock gating circuit 205a gates the interface clock signal SCLK to generate a first gated clock signal GC_FSM that clocks the shift register 201 and the FSM 302, and the second clock gating circuit 205b further gates the first gated clock signal GC_FSM to generate a second gated clock signal that clocks the register bank 203.

Accordingly, the illustrated FSM 302 generates a first clock gating control signal FSM_EN that controls a first level of clock gating and a second clock gating control signal (corresponding to the register enable signal REG_EN of FIG. 7A, in this embodiment) that controls a second level of clock gating. Additionally, the FSM 302 inhibits toggling of the clock signal provided to the register bank 203 until the configuration registers of the register bank 203 are written to at the end of a valid data frame. Thus, when the slave device 300 is not addressed by a programming command, the clock signal to the register bank 203 need not toggle.

Implementing a slave device with multiple levels of clock gating can provide a substantial reduction in current spikes of the interface supply voltage VIO. A slave device implemented with multiple levels of clock gating is also referred to herein as a super-gated slave device.

Figure 8:
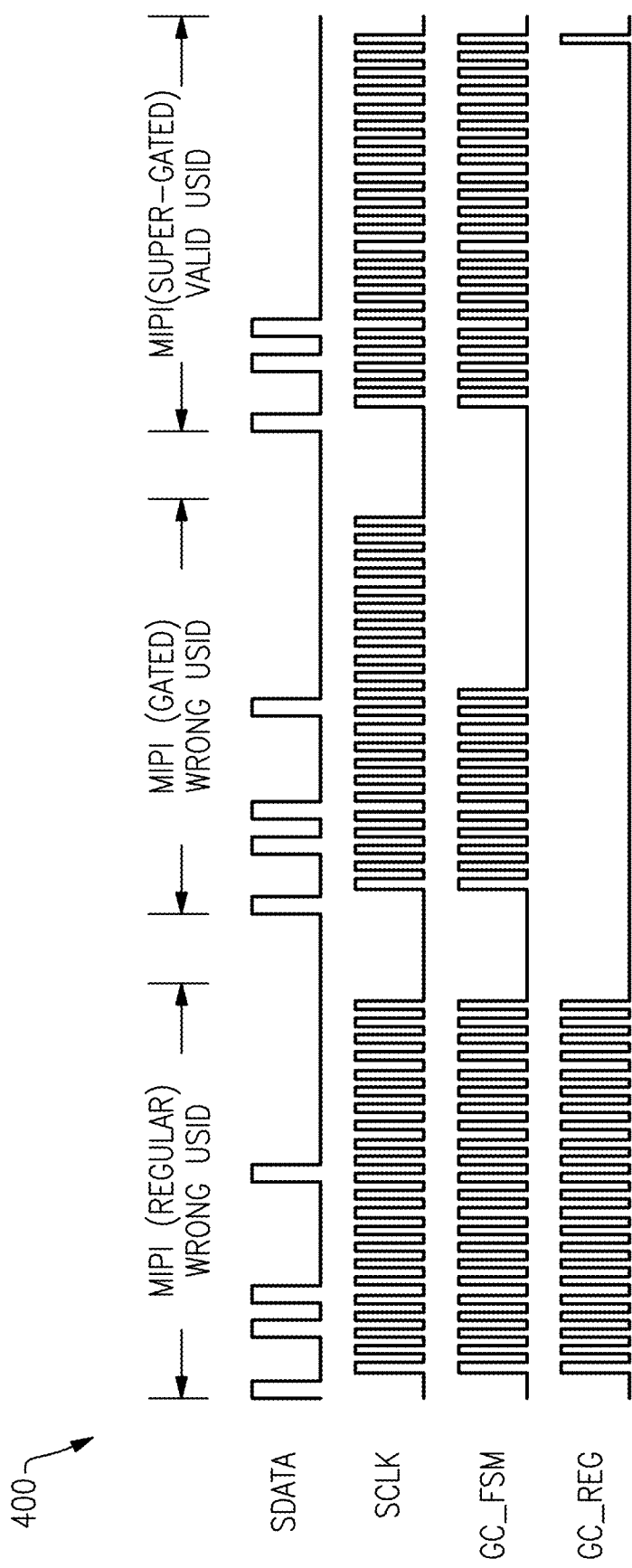
FIG. 8 is an example of a timing diagram for a MIPI RFFE interface.

FIG. 8 is an example of a timing diagram 400 for a MIPI RFFE interface. The timing diagram 400 includes three programming sequences. In the first and second programming sequences (illustrated at left and at center, respectively), the programming sequence does not identify the slave device's USID. In the third programming sequence (illustrated at right), the slave device's USID is identified.

The first programming sequence (illustrated at left) corresponds to an example in which clock gating functionality is turned off. In such an example, the FSM's clock signal (GC_FSM) toggles, and the register bank's clock signal (GC_REG) also toggles. Additionally, the second programming sequence (illustrated at center) corresponds to an example implemented in accordance with the slave device 200 of FIG. 7A. Furthermore, the third programming sequence (illustrated at right) corresponds to an example implemented in accordance with the slave device 300 of FIG. 7B. As shown in the third programming sequence, even when the programming sequence identifies the slave device, the register bank's clock signal (GC_REG) is inhibited from toggling until the registers are written.

Figure 9:
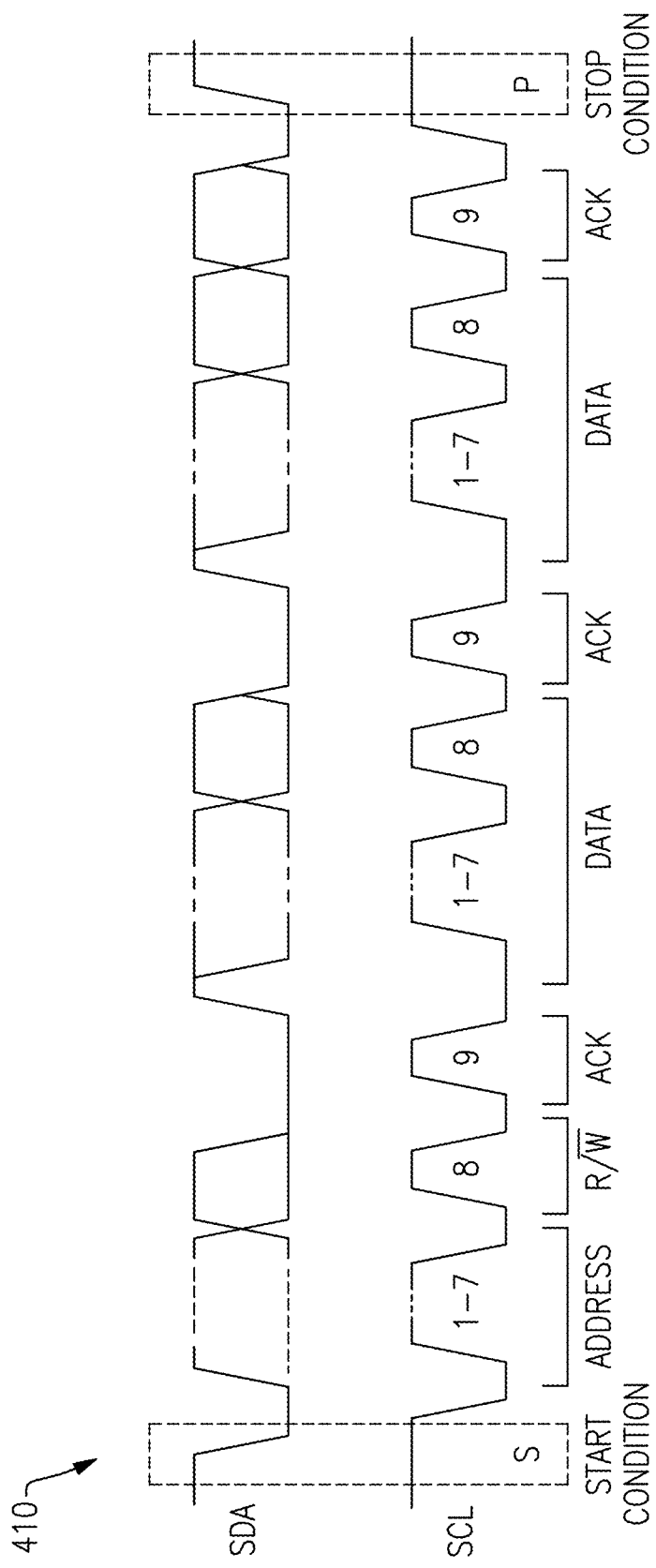
FIG. 9 is an example of a timing diagram for an inter-integrated circuit ($I^2C$) interface.

FIG. 9 is an example of a timing diagram 410 for an inter-integrated circuit (I²C) interface. The illustrated timing diagram 410 schematically depicts one example of an I²C interface command that includes a start condition, an address frame, a command type frame, a first acknowledgment frame, a first data frame, a second acknowledgment frame, a second data frame, a third acknowledgment frame, and a stop condition. Although one example of an I²C interface command is shown, the teachings herein are applicable to interface commands implemented in a wide variety of ways.

Although certain embodiments above have been depicted in the context of MIN RFFE interfaces, the teachings herein are applicable to a wide variety of other types of serial interfaces that include master and slave devices.

For example, an I²C interface is another example of a suitable interface that can employ clock gating in accordance with the teachings herein. For instance, as shown in FIG. 9, a slave address received in the address frame (ADDRESS) can be processed by an FSM or other control circuit of a slave device to control clock gating.

Figure 10A:
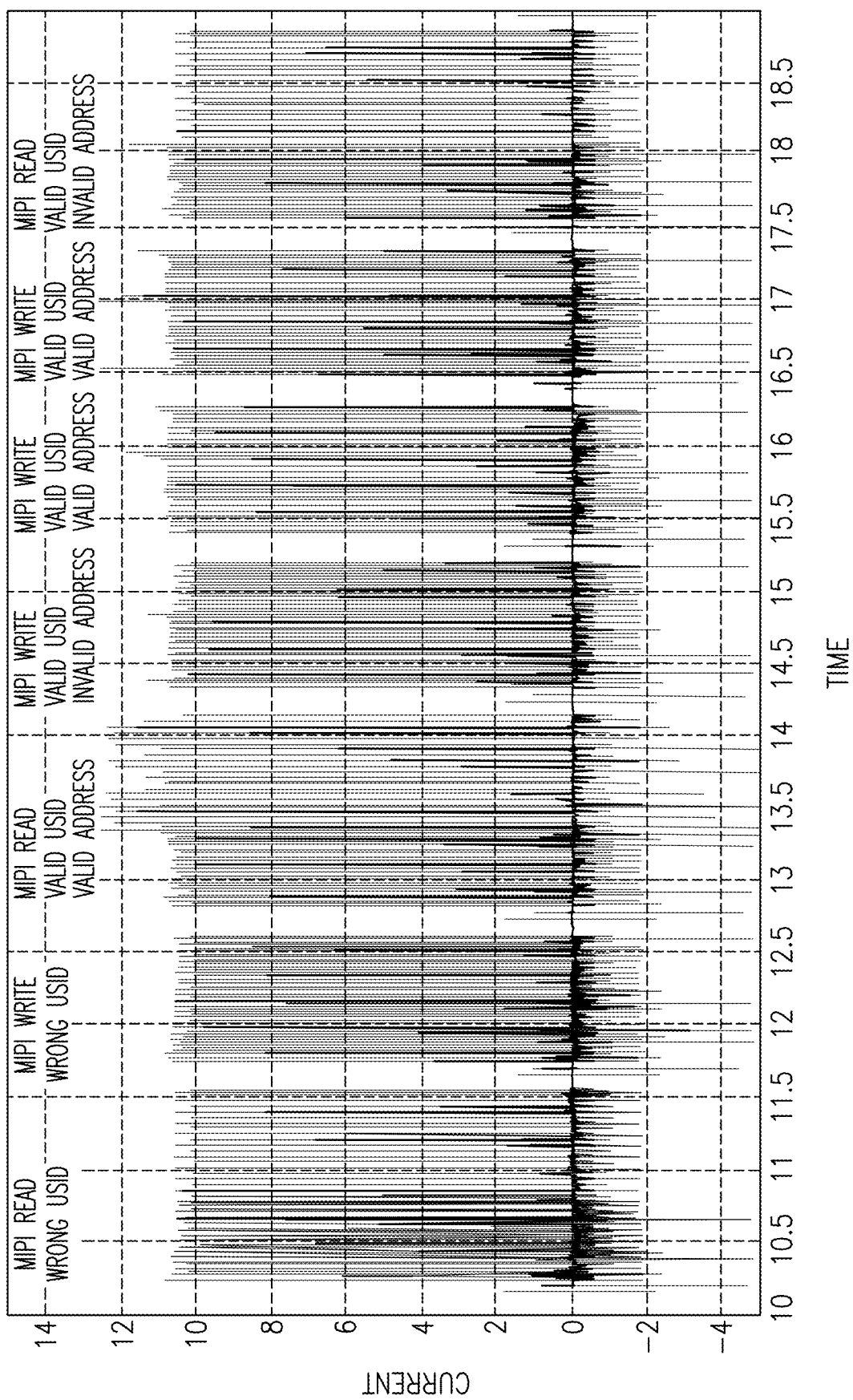
FIG. 10A is a graph of one example of interface power supply current versus time.

FIG. 10A is a graph of one example of interface power supply current versus time. The graph corresponds to current drawn from an interface supply voltage VIO versus time for a slave device implemented without clock gating.

Figure 10B:
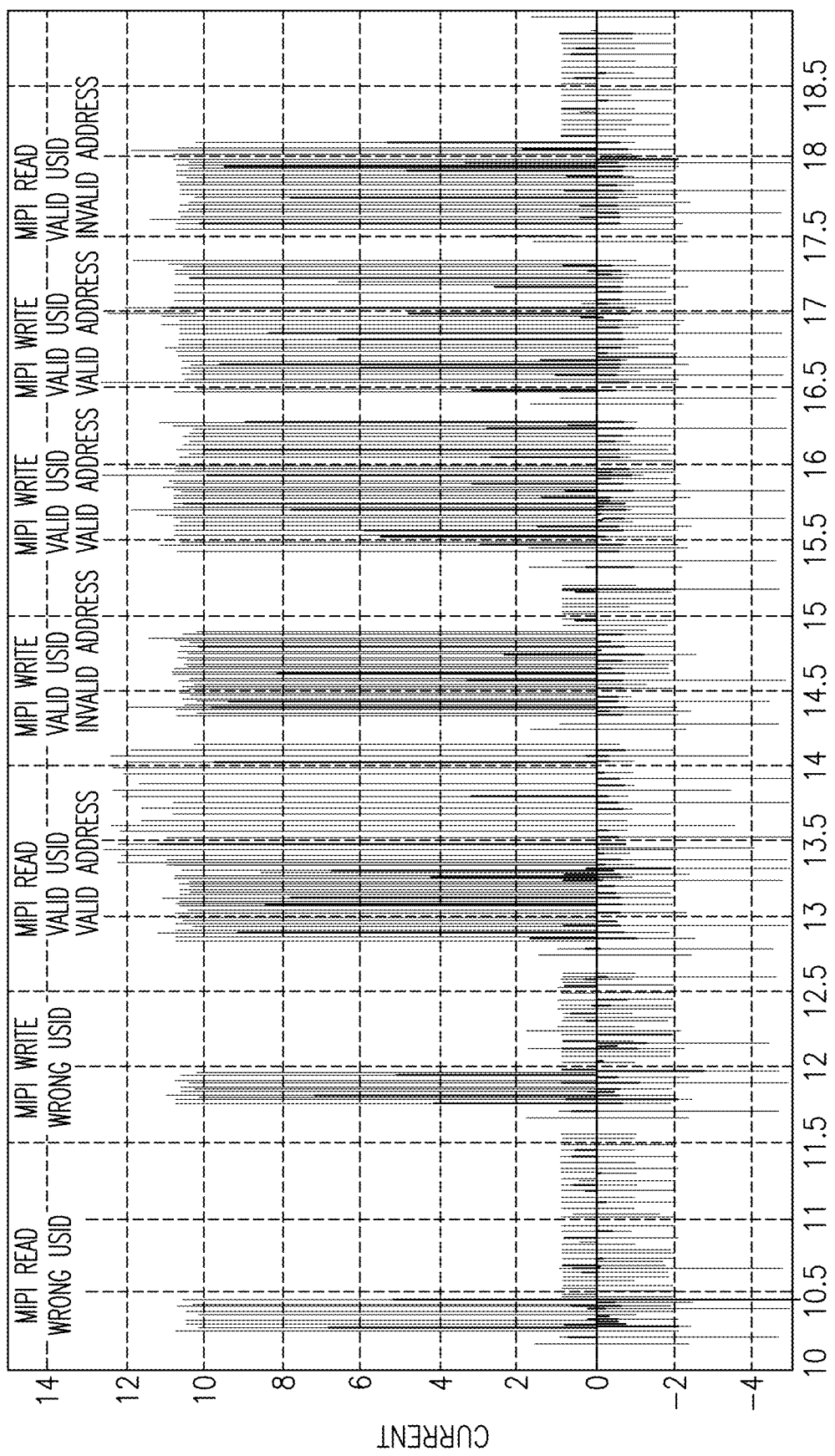
FIG. 10B is a graph of another example of interface power supply current versus time.

FIG. 10B is a graph of another example of interface power supply current versus time. The graph corresponds to current drawn from an interface supply voltage VIO versus time for one implementation of the slave device 200 of FIG. 7A.

Figure 10C:
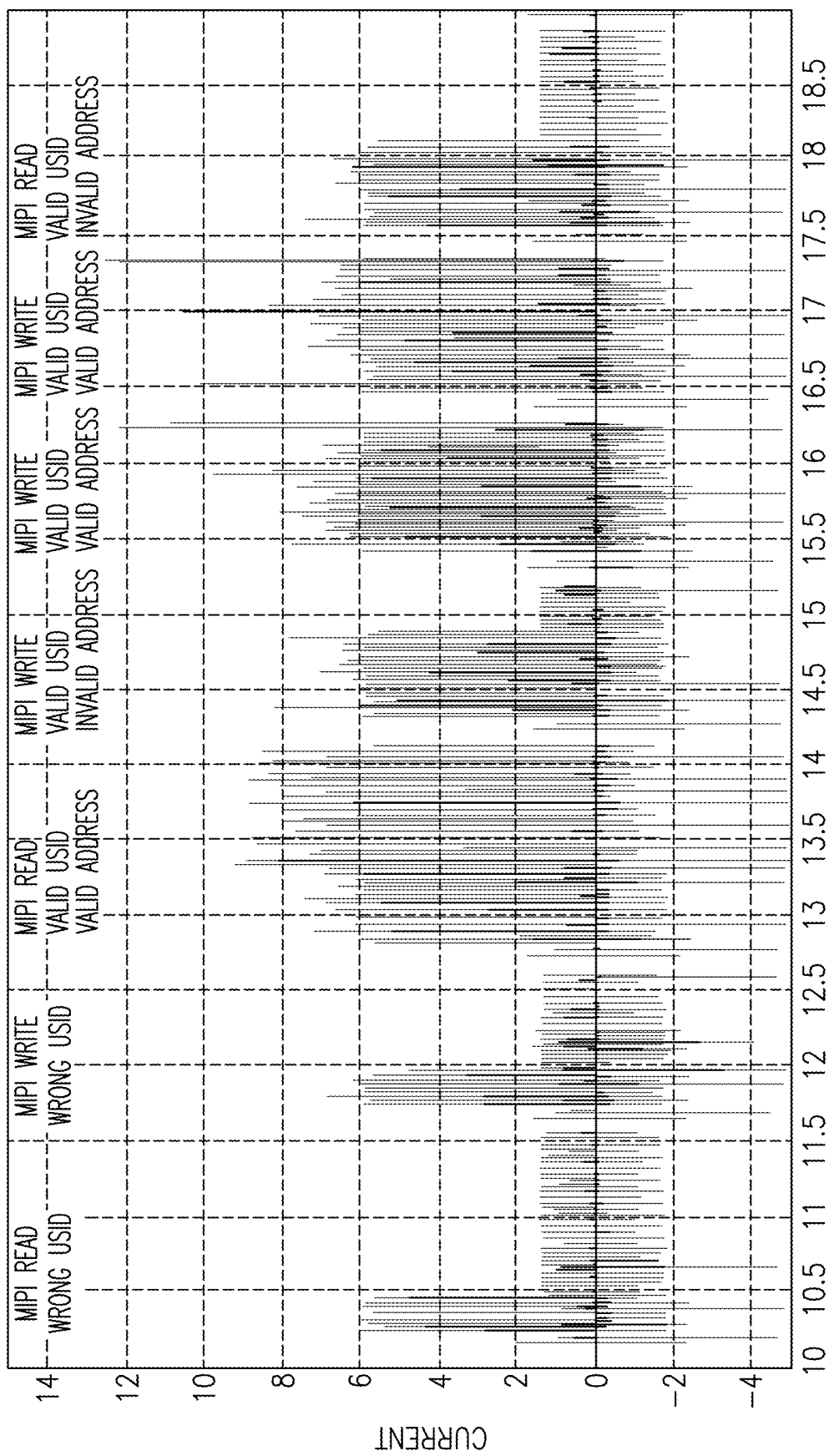
FIG. 10C is a graph of yet another example of interface power supply current versus time.

FIG. 10C is a graph of yet another example of power supply current of a serial interface versus time. The graph corresponds to current drawn from an interface supply voltage VIO versus time for one implementation of the slave device 300 of FIG. 7B.

As shown by a comparison of FIGS. 10A-10C, cutting off a clock signal when the slave address does not match the USID reduces current drawn from an interface supply voltage VIO. Moreover, further reduction of current drawn from an interface supply voltage VIO can be achieved by using multiple levels of clock gating.

Figure 11:
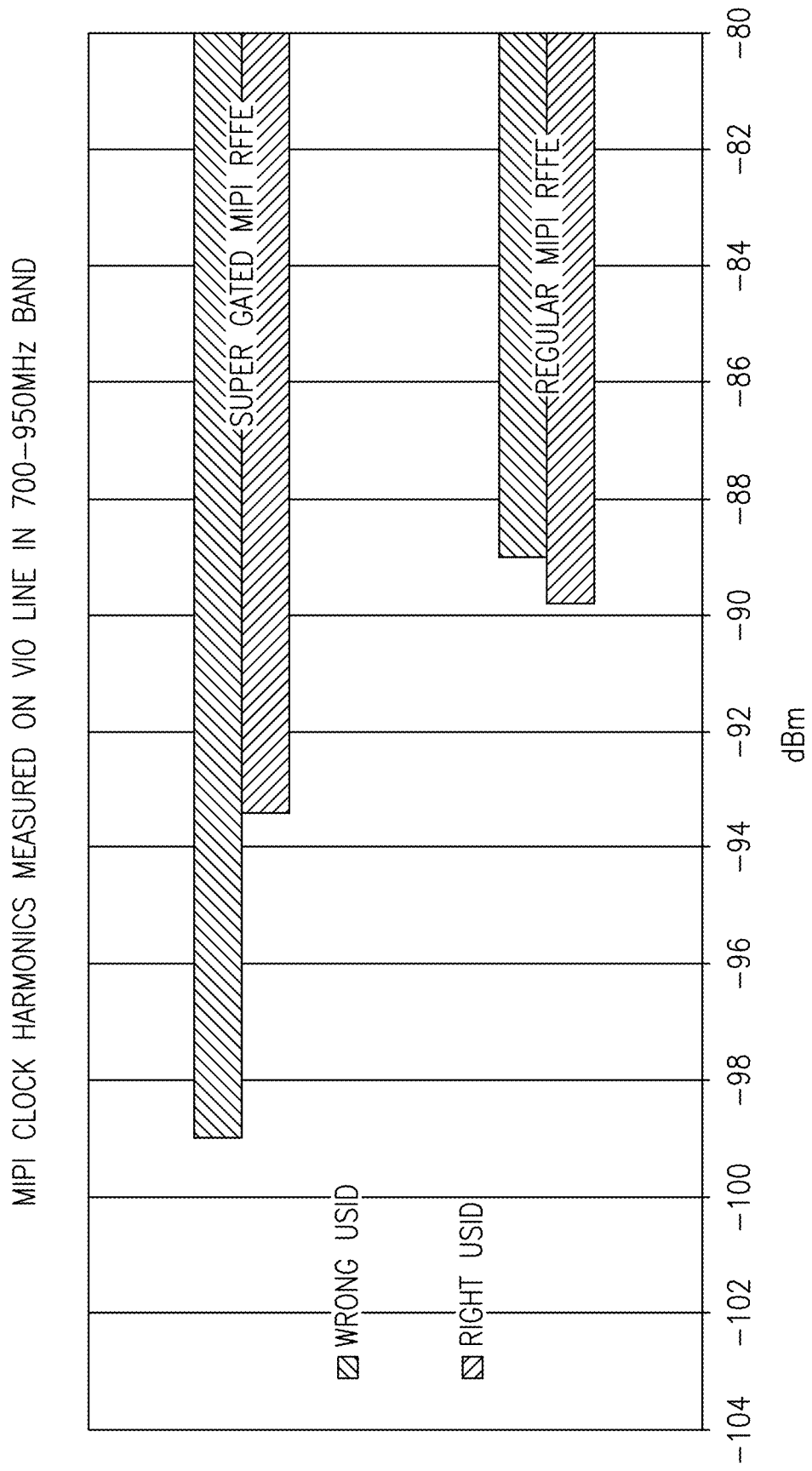
FIG. 11 is a graph of one example of serial interface clock harmonic simulations.

FIG. 11 is a graph of one example of serial interface clock harmonic simulations. The graph illustrates MIPI RFFE clock harmonics measured on the interface supply voltage VIO in the 700-950 MHz band for both matching slave address (right USID) and non-matching slave address (wrong USID). The graph also compares harmonic measurements for a slave device implemented without clock gating relative to one implementation of the slave device 300 of FIG. 7B.

As shown in FIG. 11, clock gating can lead to a reduction in harmonics, and a corresponding enhancement in RF performance.

Although various simulation results have been depicted in FIGS. 10A-11, persons having ordinary skill in the art will appreciate that simulation results can vary for a wide variety of reasons, including, but not limited to, design implementation and/or simulation tools, models and parameters. Accordingly, other simulation results are possible.

APPLICATIONS

Some of the embodiments described above have provided examples in connection with mobile phones. However, the principles and advantages of the embodiments can be used for any other systems or apparatus that have needs for serial interfaces.

Such serial interface systems can be implemented in various electronic devices. Examples of the electronic devices can include, but are not limited to, consumer electronic products, parts of the consumer electronic products, electronic test equipment, etc. Examples of the electronic devices can also include, but are not limited to, memory chips, memory modules, circuits of optical networks or other communication networks, and disk driver circuits. The consumer electronic products can include, but are not limited to, a mobile phone, a telephone, a television, a computer monitor, a computer, a hand-held computer, a personal digital assistant (PDA), a microwave, a refrigerator, an automobile, a stereo system, a disc player, a radio, a camcorder, a camera, a digital camera, a portable memory chip, a washer, a dryer, a washer/dryer, a copier, a facsimile machine, a scanner, a multi-functional peripheral device, a wrist watch, a clock, etc. Further, the electronic devices can include unfinished products.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "can," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method of integrated circuit communication in a mobile device, the method comprising:
    shifting an interface data signal of a serial interface using a shift register of an integrated circuit;
    storing configuration data received from the interface data signal using a register bank of the integrated circuit; and
    gating an interface clock signal of the serial interface using a clock distribution circuit of the integrated circuit, including gating the interface clock signal to generate a first gated clock signal that controls the shift register, and further gating the first gated clock signal to generate a second gated clock signal that controls the register bank.

2. The method of claim 1 further controlling a radio frequency core circuit of the integrated circuit using the configuration data.

3. The method of claim 1 further comprising preventing the first gated clock signal from toggling in response to determining that an address indicated by the interface data signal does not identify the integrated circuit.

4. The method of claim 3 further comprising preventing the second gated clock signal from toggling until after determining that the address identifies the integrated circuit.

5. The method of claim 1 further comprising using a control circuit of the integrated circuit to receive a shift register output signal from the shift register, and to provide the configuration data to the register bank.

6. The method of claim 5 further comprising controlling timing of a first portion of the control circuit using the first gated clock signal, and controlling timing of a second portion of the control circuit using the interface clock signal.

7. The method of claim 6 further comprising preventing the clock distribution circuit from gating the interface clock signal in response to detecting a start-up sequence of the serial interface using the second portion of the control circuit.

8. An integrated circuit for a mobile device, the integrated circuit comprising:
    a clock pin and a signal pin configured to couple to a serial interface;
    a shift register configured to shift an interface data signal received from the signal pin;
    a register bank configured to store configuration data obtained from the interface data signal; and
    a clock distribution circuit configured to gate an interface clock signal received from the clock pin to generate a first gated clock signal that controls the shift register, and to further gate the first gated clock signal to generate a second gated clock signal that controls the register bank.

9. The integrated circuit of claim 8 further comprising a radio frequency core circuit controlled by the configuration data.

10. The integrated circuit of claim 8 further comprising a control circuit configured to provide the clock distribution circuit with a first clock gating control signal for controlling the first gated clock signal and a second clock gating control signal for controlling the second gated clock signal.

11. The integrated circuit of claim 10 wherein the control circuit uses the first clock gating control signal to prevent the first gated clock signal from toggling in response to determining that an address indicated by the interface data signal does not identify the integrated circuit.

12. The integrated circuit of claim 11 wherein the control circuit uses the second clock gating control signal to prevent the second gated clock signal from toggling until after the control circuit determines that the address identifies the integrated circuit.

13. The integrated circuit of claim 10 wherein the control circuit receives a shift register output signal from the shift register, and provides the configuration data to the register bank.

14. The integrated circuit of claim 10 wherein the first gated clock signal is further operable to control timing of a first portion of the control circuit, and the interface clock signal is operable to control timing of a second portion of the control circuit.

15. The integrated circuit of claim 14 wherein the second portion of the control circuit includes a start-up sequence detector configured to prevent the clock distribution circuit from gating the interface clock signal in response to detecting a start-up sequence of the serial interface.

16. A mobile device comprising:
a serial interface;
a first integrated circuit configured to send an interface clock signal and an interface data signal over the serial interface and
a second integrated circuit including a shift register configured to shift the interface data signal, a register bank configured to store configuration data received from the interface data signal, and a clock distribution circuit configured to gate the interface clock signal to generate a first gated clock signal that controls the shift register, and to further gate the first gated clock signal to generate a second gated clock signal that controls the register bank.

17. The mobile device of claim 16 wherein the second integrated circuit includes a radio frequency core circuit controlled by the configuration data.

18. The mobile device of claim 16 wherein the second integrated circuit includes a control circuit configured to provide the clock distribution circuit with a first clock gating control signal for controlling the first gated clock signal and a second clock gating control signal for controlling the second gated clock signal.

19. The mobile device of claim 18 wherein the control circuit uses the first clock gating control signal to prevent the first gated clock signal from toggling in response to determining that an address indicated by the interface data signal does not identify the second integrated circuit.

20. The mobile device of claim 19 wherein the control circuit uses the second clock gating control signal to prevent the second gated clock signal from toggling until after the control circuit determines that the address identifies the second integrated circuit.

* * * * *